US012220916B2

(12) United States Patent
(10) Patent No.: US 12,220,916 B2
(45) Date of Patent: Feb. 11, 2025

Mikoshiba et al.

(54) LIQUID DISCHARGE APPARATUS

(71) Applicant: SEIKO EPSON CORPORATION, Tokyo (JP)

(72) Inventors: Masanori Mikoshiba, Shimosuwa-machi (JP); Motoki Takabe, Shiojiri (JP); Takanori Aimono, Matsumoto (JP); Jingling Wang, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 177 days.

(21) Appl. No.: 18/164,999

(22) Filed: Feb. 6, 2023

(65) Prior Publication Data

US 2023/0249456 A1 Aug. 10, 2023

(30) Foreign Application Priority Data

Feb. 7, 2022 (JP) ................................ 2022-017211

(51) Int. Cl.
*B41J 2/045* (2006.01)
*B41J 2/14* (2006.01)

(52) U.S. Cl.
CPC ....... *B41J 2/04588* (2013.01); *B41J 2/04581* (2013.01); *B41J 2/14233* (2013.01)

(58) Field of Classification Search
CPC .................................................... B41J 2/04588
See application file for complete search history.

(56) References Cited

U.S. PATENT DOCUMENTS

2014/0267478 A1 9/2014 Yokoyama
2023/0226817 A1* 7/2023 Takabe ................ H10N 30/802 347/10
2023/0249451 A1* 8/2023 Mikoshiba ........... B41J 2/14233 347/14

FOREIGN PATENT DOCUMENTS

JP 2000-025225 A 1/2000
JP 2014-172342 A 9/2014

* cited by examiner

*Primary Examiner* — Julian D Huffman
(74) *Attorney, Agent, or Firm* — WORKMAN NYDEGGER

(57) ABSTRACT

A liquid discharge apparatus includes a pressure chamber substrate laminated on a first surface of a diaphragm and including a partition wall partitioning a pressure chamber communicating with a nozzle for discharging liquid, a piezoelectric element laminated on a second surface of the diaphragm and including a first active portion that overlaps a center of the pressure chamber when viewed in a thickness direction of the diaphragm and a second active portion that overlaps the pressure chamber at a position closer to an outer edge of the pressure chamber than the first active portion, and a drive signal generation portion that generates a drive signal, and a shrinkage step is executed in which a first period during which a first shrinkage element is supplied to the first active portion and a second period during which a second shrinkage element is supplied to the second active portion overlap.

20 Claims, 23 Drawing Sheets

LIQUID DISCHARGE APPARATUS

The present application is based on, and claims priority from JP Application Serial Number 2022-017211, filed Feb. 7, 2022, the disclosure of which is hereby incorporated by reference herein in its entirety.

BACKGROUND

1. Technical Field

The present disclosure relates to a liquid discharge apparatus.

2. Related Art

A liquid discharge apparatus typified by a piezo-type ink jet printer generally employs a configuration in which a piezoelectric element is disposed on a diaphragm that constitutes a part of a wall surface of a pressure chamber communicating with a nozzle. Here, liquid such as ink is accommodated in the pressure chamber. By deforming the diaphragm, the piezoelectric element causes the liquid to discharge from the nozzle with expansion or shrinkage of the volume of the pressure chamber.

For example, as disclosed in JP-A-2000-25225, the piezoelectric element of such a liquid discharge apparatus may be divided into an active portion that overlaps a central portion of the pressure chamber and an active portion that overlaps an end portion of the pressure chamber when viewed in the thickness direction of the diaphragm.

However, in JP-A-2000-25225, there is no disclosure of specific drive signals for driving each of the two active portions described above. Under such circumstances, it is desired to realize a liquid discharge apparatus having excellent discharge characteristics.

SUMMARY

According to an aspect of the present disclosure, there is provided an liquid discharge apparatus including a diaphragm that has a first surface and a second surface facing in a direction opposite to the first surface, a pressure chamber substrate laminated on the first surface and including a partition wall partitioning a pressure chamber communicating with a nozzle for discharging liquid, a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion, and a drive signal generation portion that generates a first drive signal that drives the first active portion and a second drive signal that drives the second active portion, in which the first drive signal includes a first shrinkage element that shrinks a volume of the pressure chamber per periodic unit period, the second drive signal includes a second shrinkage element that shrinks the volume of the pressure chamber per unit period, and a shrinkage step is executed in which a first period during which the first shrinkage element is supplied to the first active portion and a second period during which the second shrinkage element is supplied to the second active portion overlap.

According to another aspect of the present disclosure, there is provided an liquid discharge apparatus including a diaphragm that has a first surface and a second surface facing in a direction opposite to the first surface, a pressure chamber substrate laminated on the first surface and including a partition wall partitioning a pressure chamber communicating with a nozzle for discharging liquid, a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion, and a drive signal generation portion that generates a first drive signal that drives the first active portion and a second drive signal that drives the second active portion, in which the first drive signal includes a first period during which a first potential changes to a second potential per periodic unit period, the second drive signal includes a second period during which a third potential changes to a fourth potential per unit period, and the first period and the second period overlap.

DESCRIPTION OF EXEMPLARY EMBODIMENTS

Figure 1:
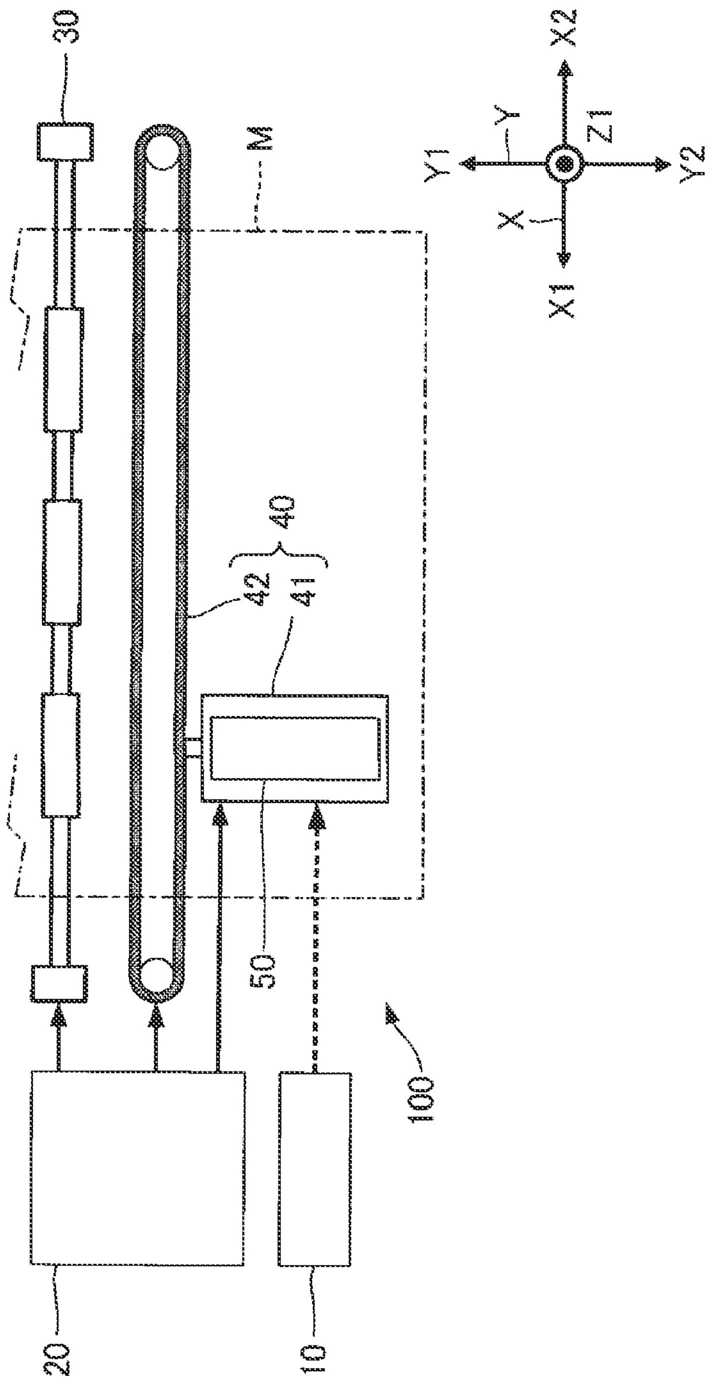
FIG. 1 is a configuration diagram schematically illustrating a liquid discharge apparatus according to a first embodiment.

Hereinafter, preferred embodiments according to the present disclosure will be described with reference to the accompanying drawings. In the drawings, the dimensions and scale of each portion are appropriately different from the actual ones, and some parts are schematically illustrated for easy understanding. In addition, the scope of the present disclosure is not limited to these forms unless it is stated in the following description that the present disclosure is particularly limited.

In the following description, for the sake of convenience, the X axis, Y axis, and Z axis that intersect each other are appropriately used. In addition, in the following, one direction along the X axis is the X1 direction, and the direction opposite to the X1 direction is the X2 direction. Similarly, the directions opposite to each other along the Y axis are the Y1 direction and the Y2 direction. In addition, the directions opposite to each other along the Z axis are the Z1 direction and the Z2 direction. In addition, viewing in a direction along the Z axis may be referred to as "plan view".

Here, typically, the Z axis is a vertical axis, and the Z2 direction corresponds to the downward direction in the vertical direction. However, the Z axis may not be a vertical axis. In addition, the X axis, the Y axis, and the Z axis are typically orthogonal to each other, but are not limited thereto, and may intersect at an angle within a range of, for example, 80° or more and 100° or less.

1. First Embodiment

1-1. Overall Configuration of Liquid Discharge Apparatus

FIG. 1 is a configuration diagram schematically illustrating a liquid discharge apparatus 100 according to a first embodiment. The liquid discharge apparatus 100 is an ink jet printing apparatus that discharges ink, which is an example of liquid, onto a medium M as a droplet. The medium M is a typically printing paper. The medium M is not limited to the printing paper, and may be a printing target of any material such as a resin film or cloth.

As illustrated in FIG. 1, the liquid discharge apparatus 100 includes a liquid container 10, a control unit 20, a transport mechanism 30, a movement mechanism 40, and a liquid discharge head 50.

The liquid container 10 is a container that stores ink. Examples of specific aspects of the liquid container 10 include a cartridge that can be attached to and detached from the liquid discharge apparatus 100, a bag-shaped ink pack made of a flexible film, and an ink tank that can be refilled with ink. The type of ink stored in the liquid container 10 is random.

The control unit 20 includes, for example, a processing circuit such as a central processing unit (CPU) or a field programmable gate array (FPGA) and a storage circuit such as a semiconductor memory, and controls the operation of each element of the liquid discharge apparatus 100.

The transport mechanism 30 transports the medium M in the Y2 direction under the control of the control unit 20. The movement mechanism 40 reciprocates the liquid discharge head 50 in the X1 direction and the X2 direction under the control of the control unit 20. In the example illustrated in FIG. 1, the movement mechanism 40 includes a substantially box-shaped carriage 41 that accommodates the liquid discharge head 50, and an endless transport belt 42 to which the carriage 41 is fixed. The number of liquid discharge heads 50 mounted on the carriage 41 is not limited to one, and may be plural. In addition, the liquid container 10 described above may be mounted on the carriage 41 in addition to the liquid discharge head 50.

Under the control of the control unit 20, the liquid discharge head 50 discharges the ink supplied from the liquid container 10 toward the medium M from each of a plurality of nozzles in the Z2 direction. The discharge is performed in parallel with the transport of the medium M by the transport mechanism 30 and the reciprocating movement of the liquid discharge head 50 by the movement mechanism 40, and thus an image by ink is formed on the surface of the medium M.

1-2. Electrical Configuration of Liquid Discharge Apparatus

Figure 2:
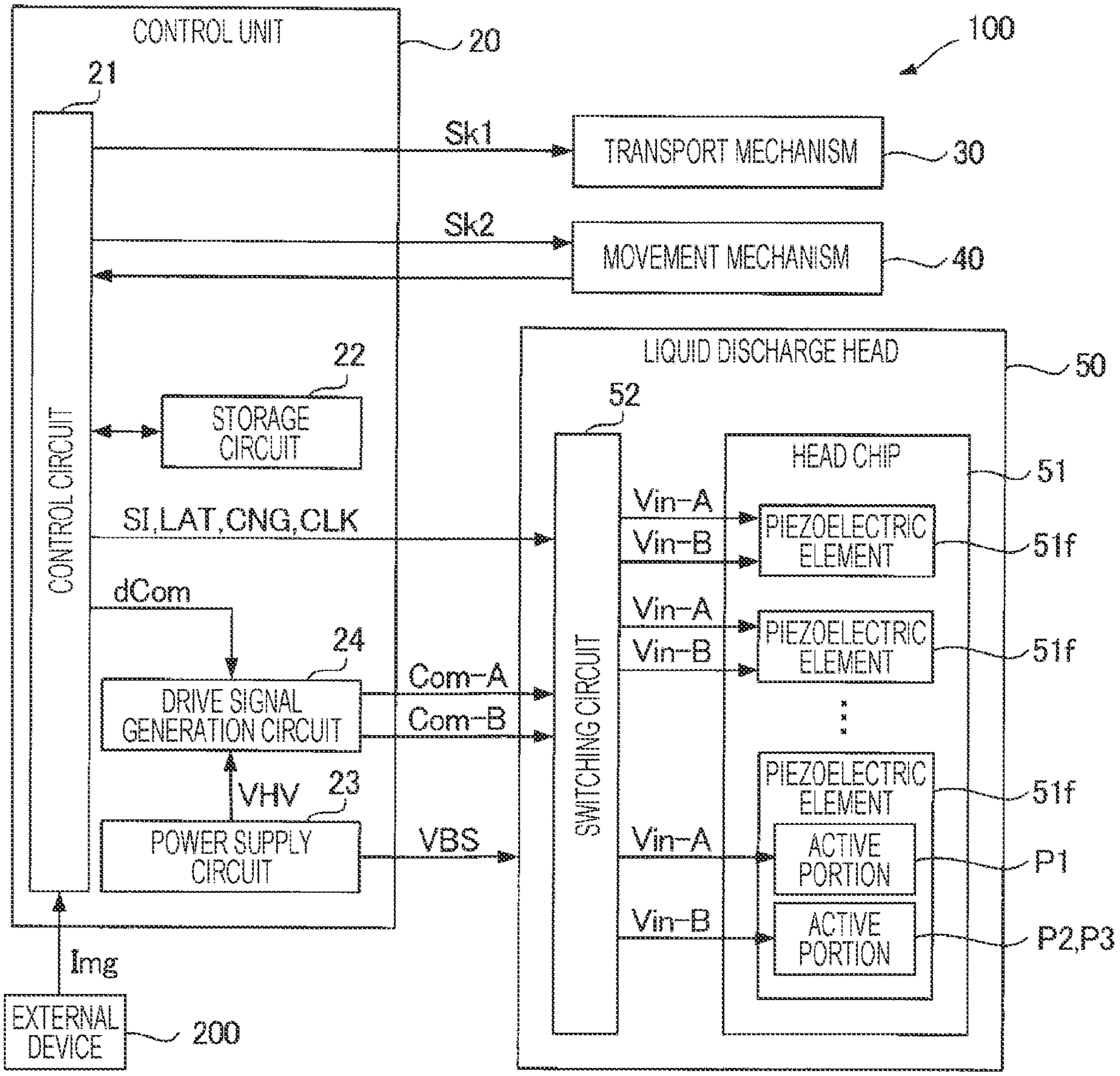
FIG. 2 is a diagram illustrating an electrical configuration of the liquid discharge apparatus according to the first embodiment.

FIG. 2 is a diagram illustrating an electrical configuration of the liquid discharge apparatus 100 according to the first embodiment. Hereinafter, the control unit 20 will be described with reference to FIG. 2, and prior to this, the liquid discharge head 50 will be briefly described.

As illustrated in FIG. 2, the liquid discharge head 50 includes a head chip 51 and a switching circuit 52.

The head chip 51 includes a plurality of piezoelectric elements **51*f*, and ink is discharged from the nozzle by appropriately driving the plurality of piezoelectric elements 51*f*. Here, each piezoelectric element 51*f* includes an active portion P1 that is an example of the "first active portion", an active portion P2 that is an example of the "second active portion", and an active portion P3 that is an example of the "third active portion". The active portion P1 is driven by receiving the supply of a supply signal Vin-A. On the other hand, each of the active portions P2 and P3 is driven by receiving the supply of a supply signal Vin-B. Details of the head chip 51 will be described later with reference to FIGS. 3 to 6**.

Under the control of the control unit 20, the switching circuit 52 switches whether or not to supply a first drive signal Com-A and a second drive signal Com-B output from the control unit 20 to each piezoelectric element **51*f* for each of the plurality of piezoelectric elements 51*f* of the head chip 51. The first drive signal Com-A is supplied to the active portion P1 as the supply signal Vin-A. The second drive signal Com-B is supplied to the active portions P2 and P3 as the supply signal Vin-B. The details of the switching circuit 52 will be described later with reference to FIG. 7**.

In the example illustrated in FIG. 2, the number of head chips 51 included in the liquid discharge head 50 is one, but the present disclosure is not limited thereto, and the number of head chips 51 included in the liquid discharge head 50 may be two or more.

As illustrated in FIG. 2, the control unit 20 includes a control circuit 21, a storage circuit 22, a power supply circuit 23, and a drive signal generation circuit 24, which is an example of the "drive signal generation portion".

The control circuit 21 has a function of controlling the operation of each portion of the liquid discharge apparatus 100 and a function of processing various data. The control circuit 21 includes, for example, one or more processors such as a central processing unit (CPU).

The storage circuit 22 stores various programs executed by the control circuit 21 and various data such as print data Img processed by the control circuit 21. The storage circuit 22 includes, for example, a semiconductor memory of one or both of volatile memories such as a random access memory (PAM) and a non-volatile memory such as a read only memory (ROM), an electrically erasable programmable read-only memory (EEPROM) or a programmable ROM (PROM). The print data Img is supplied from an external device 200 such as a personal computer or a digital camera.

The power supply circuit 23 receives power from a commercial power supply (not illustrated) and generates various predetermined potentials. The various generated potentials are appropriately supplied to each portion of the liquid discharge apparatus 100. For example, the power supply circuit 23 generates a power supply potential VHV and an offset potential VBS. The offset potential VBS is supplied to the liquid discharge head 50. In addition, the power supply potential VHV is supplied to the drive signal generation circuit 24.

The drive signal generation circuit 24 is a circuit that generates the first drive signal Com-A and the second drive signal Com-B. Specifically, the drive signal generation circuit 24 includes, for example, a DA conversion circuit and an amplifier circuit. In the drive signal generation circuit 24, the DA conversion circuit converts a waveform designation signal dCom from the control circuit 21 from a digital signal to an analog signal, and the amplifier circuit amplifies the analog signal using the power supply potential VHV from the power supply circuit 23 to generate each of the first drive signal Com-A and the second drive signal Com-B. Here, among the waveforms included in the first drive signal Com-A, the waveform signal actually supplied to the active portion P1 of the piezoelectric element 51*f* is the supply signal Vin-A described above. Among the waveforms included in the second drive signal Com-B, the waveform signal actually supplied to the active portion P2 or the active portion P3 of the piezoelectric element 51*f* is the supply signal Vin-B described above. The waveform designation signal dCom is a digital signal for defining the waveforms of the first drive signal Com-1 and the second drive signal Com-B.

The control circuit 21 controls the operation of each portion of the liquid discharge apparatus 100 by executing a program stored in the storage circuit 22. Here, by executing the program, the control circuit 21 generates control signals Sk1 and Sk2, a print data signal SI, a waveform designation signal dCom, a latch signal LAT, a change signal CNG, and a clock signal CLK as a signal for controlling the operation of each portion of the liquid discharge apparatus 100.

The control signal Sk1 is a signal for controlling the drive of the transport mechanism 30. The control signal Sk2 is a signal for controlling the drive of the movement mechanism 40. The print data signal SI is a digital signal for designating an operating state of the piezoelectric element 51*f*. The latch signal LAT and the change signal CNG are timing signals that are used together with the print data signal SI and define the ink discharge timing from each nozzle of the head chip 51. These timing signals are generated, for example, based on the output of an encoder that detects the position of the carriage 41 described above.

1-3. Overall Configuration of Liquid Discharge Head

Figure 3:
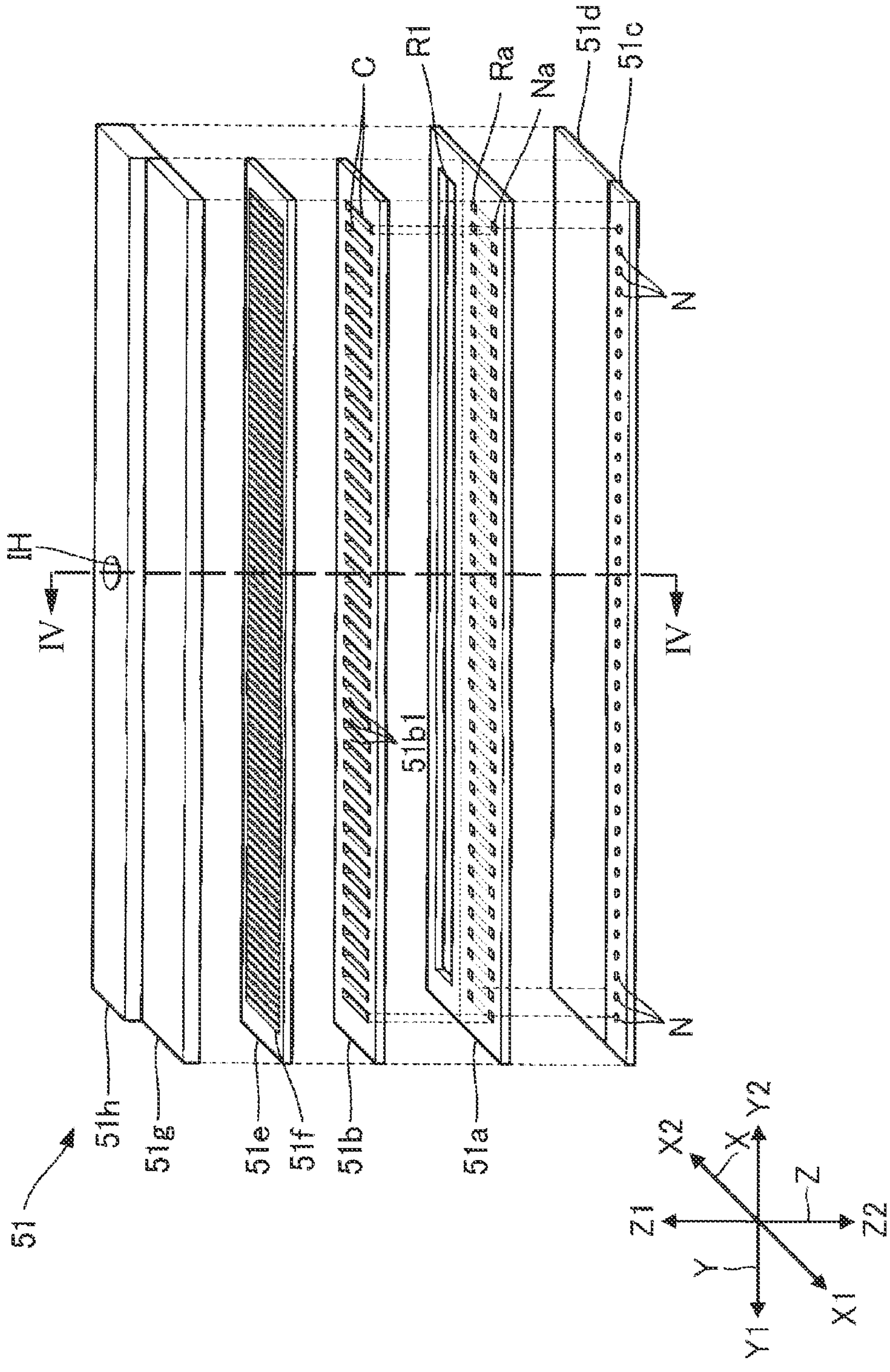
FIG. 3 is an exploded perspective view of a head chip.
Figure 4:
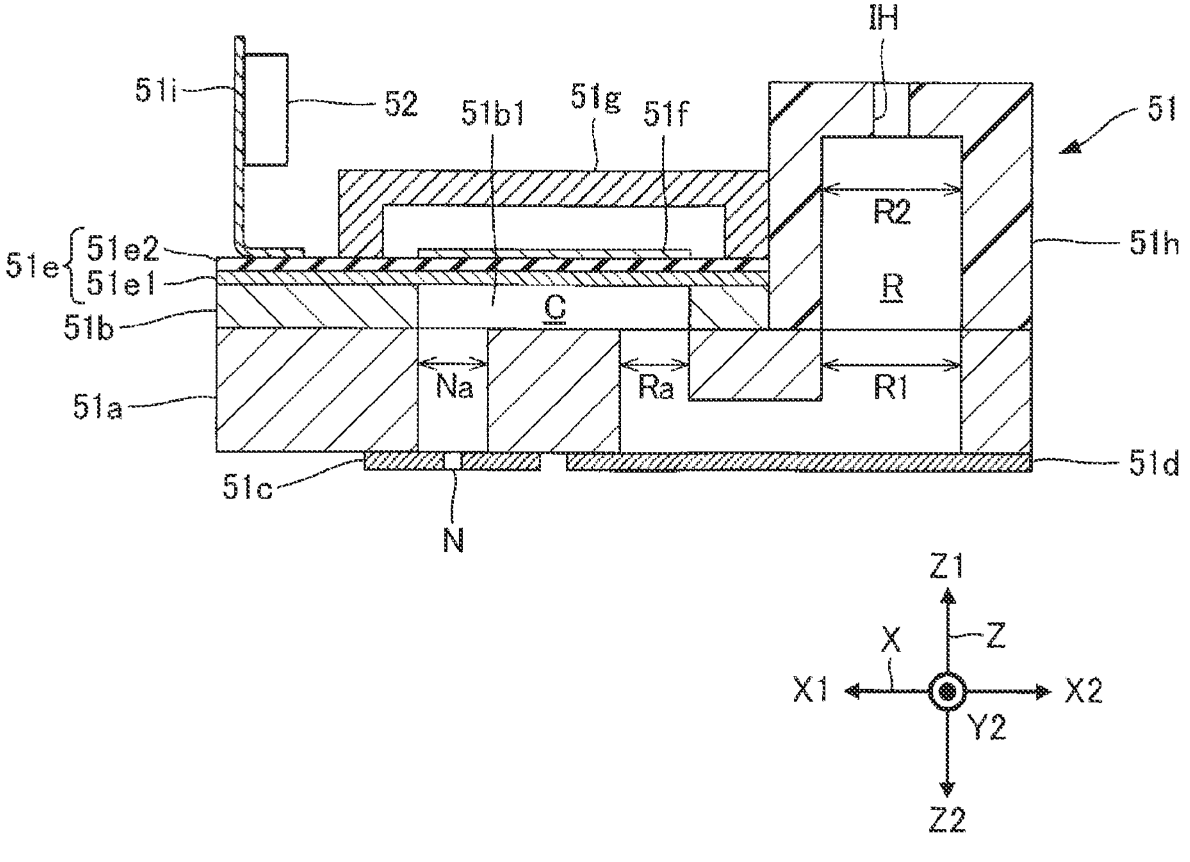
FIG. 4 is a cross-sectional view taken along the line IV-IV in FIG. 3.

FIG. 3 is an exploded perspective view of the head chip 51. FIG. 4 is a cross-sectional view taken along the line IV-IV in FIG. 3. As illustrated in FIGS. 3 and 4, the head chip 51 includes a flow path substrate 51*a*, a pressure chamber substrate 51*b*, a nozzle plate 51*c*, a vibration absorber 51*d*, a diaphragm 51*e*, a plurality of piezoelectric elements 51*f*, a cover 51*g*, a case 51*h*, and a wiring substrate 51*i*.

Here, the pressure chamber substrate 51*b*, the diaphragm 51*e*, the plurality of piezoelectric elements 51*f*, the case 51*h*, and the cover 51*g* are installed in a region located in the Z1 direction from the flow path substrate 51*a*. On the other hand, the nozzle plate 51*c* and the vibration absorber 51*d* are installed in a region located in the Z2 direction from the flow path substrate 51*a*. Each element of the liquid discharge head 50 is generally a plate-like member elongated in the direction along the Y axis, and is bonded to each other with an adhesive, for example.

As illustrated in FIG. 3, the nozzle plate 51*c* is a plate-like member provided with a plurality of nozzles N arranged in a direction along the Y axis. Each nozzle N is a through-hole through which ink passes. The nozzle plate 51*c* is manufactured by processing a silicon single crystal substrate by a semiconductor manufacturing technique using a processing technique such as dry etching or wet etching, for example. However, other known methods and materials may be appropriately used for manufacturing the nozzle plate 51*c*.

The flow path substrate 51*a* is a plate-like member for forming a flow path for ink. As illustrated in FIGS. 2 and 3, the flow path substrate 51*a* is provided with an opening portion R1, a plurality of supply flow paths Ra, and a plurality of communication flow paths Na. The opening portion R1 is an elongated through-hole extending in the direction along the Y axis so as to be continuous over the plurality of nozzles N in plan view viewed in the direction along the Z axis. On the other hand, each of the supply flow path Ra and the communication flow path Na is a through-hole provided for each nozzle N individually. Each of the plurality of supply flow paths Ra communicates with the opening portion R1. The flow path substrate 51*a* is manufactured by processing a silicon single crystal substrate by, for example, semiconductor manufacturing technique, similarly to the nozzle plate 51*c* described above. However, other known methods and materials may be appropriately used for manufacturing the flow path substrate 51*a*. A part of the supply flow path Ra may be formed in the pressure chamber substrate 51*b*.

The pressure chamber substrate 51*b* is a plate-like member in which a plurality of pressure chambers C corresponding to the plurality of nozzles N are formed. The pressure chamber C is located between the flow path substrate 51*a* and the diaphragm 51*e*, and is a space called a cavity for applying pressure to the ink filled in the pressure chamber C. The plurality of pressure chambers C are arranged in the direction along the Y axis. Each pressure chamber C is configured to include holes that open on both surfaces of the pressure chamber substrate 51*b*, and has an elongated shape extending in the direction along the X axis. The end of each pressure chamber C in the X2 direction communicates with the corresponding supply flow path Ra. The cross-sectional area of the supply flow path Ra is narrower than that of the pressure chamber C, and this portion functions as a flow path resistance, so that backflow is suppressed when pressure is applied to the ink. On the other hand, the end of each pressure chamber C in the X1 direction communicates with the corresponding communication flow path Na. The pressure chamber substrate 51*b* is manufactured by processing a silicon single crystal substrate by, for example, semiconductor manufacturing technique, similar to the nozzle plate 51*c* described above. However, other known methods and materials may be appropriately used for the manufacture of each of the pressure chamber substrates 51*b*.

The diaphragm 51*e* is disposed on the surface of the pressure chamber substrate 51*b* facing the Z1 direction. The diaphragm 51*e* is a plate-like member that can elastically deform. In the example illustrated in FIG. 4, the diaphragm 51*e* includes a first layer 51*e*1 that is an elastic film and a second layer 51*e*2 that is an insulating film, which are laminated in this order in the Z1 direction. The details of the diaphragm 51*e* will be described with reference to FIG. 6 described later.

The plurality of piezoelectric elements 51*f* corresponding to the nozzles N or the pressure chambers C different from each other are disposed on the surface of the diaphragm 51*e* facing the Z1 direction. Each piezoelectric element 51*f* is a passive element deformed by the supply of the first drive signal Com-A and the second drive signal Com-B, and has an elongated shape extending in the direction along the X axis. The plurality of piezoelectric elements 51*f* are arranged in a direction along the Y axis so as to correspond to the plurality of pressure chambers C. When the diaphragm 51*e* vibrates in conjunction with the deformation of the piezoelectric element 51*f*, the pressure in the pressure chamber C fluctuates, so that ink is discharged from the nozzle N. Details of the piezoelectric element 51*f* will be described with reference to FIG. 6 described later.

The case 51*h* is a case for storing the ink supplied to the plurality of pressure chambers C, and is bonded to the surface of the flow path substrate 51*a* facing the Z1 direction with an adhesive or the like. The case 51*h* is made of, for example, a resin material and manufactured by injection molding. The case 51*h* is provided with an accommodation portion R2 and an inlet IH. The accommodation portion R2 is a recessed portion having an outer shape corresponding to the opening portion R1 of the flow path substrate 51*a*. The inlet IH is a through-hole that communicates with the accommodation portion R2. A space defined by the opening portion R1 and the accommodation portion R2 functions as a liquid storage chamber R, which is a reservoir for storing ink. Ink from the liquid container 10 is supplied to the liquid storage chamber R through the inlet IH.

The vibration absorber 51*d* is an element for absorbing pressure fluctuations in the liquid storage chamber R. The vibration absorber 51*d* is, for example, a compliance substrate that is an elastically deformable flexible sheet member. Here, the vibration absorber 51*d* is disposed on the surface of the flow path substrate 51*a* facing the Z2 direction so as to block the opening portion R1 of the flow path substrate 51*a* and the plurality of supply flow paths Ra to constitute the bottom surface of the liquid storage chamber R.

The cover 51*g* is a structure that protects the plurality of piezoelectric elements 51*f* and reinforces the mechanical strength of the pressure chamber substrate 51*b* and the diaphragm 51*e*. The cover 51*g* is bonded to the surface of the diaphragm 51*e* with an adhesive, for example. The cover 51*g* is provided with recessed portions that accommodate the plurality of piezoelectric elements 51*f*.

The wiring substrate 51*i* is bonded to the surface of the pressure chamber substrate 51*b* or the diaphragm 51*e* facing the Z1 direction. The wiring substrate 51*i* is a mounting component on which a plurality of wirings for electrically coupling the control unit 20 and the liquid discharge head 50 are formed. The wiring substrate 51*i* is a flexible wiring substrate such as a flexible printed circuit (FPC) and a flexible flat cable (FFC). The switching circuit 52 is mounted on the wiring substrate 51*i*.

1-4. Details of Diaphragm and Piezoelectric Element

Figure 5:
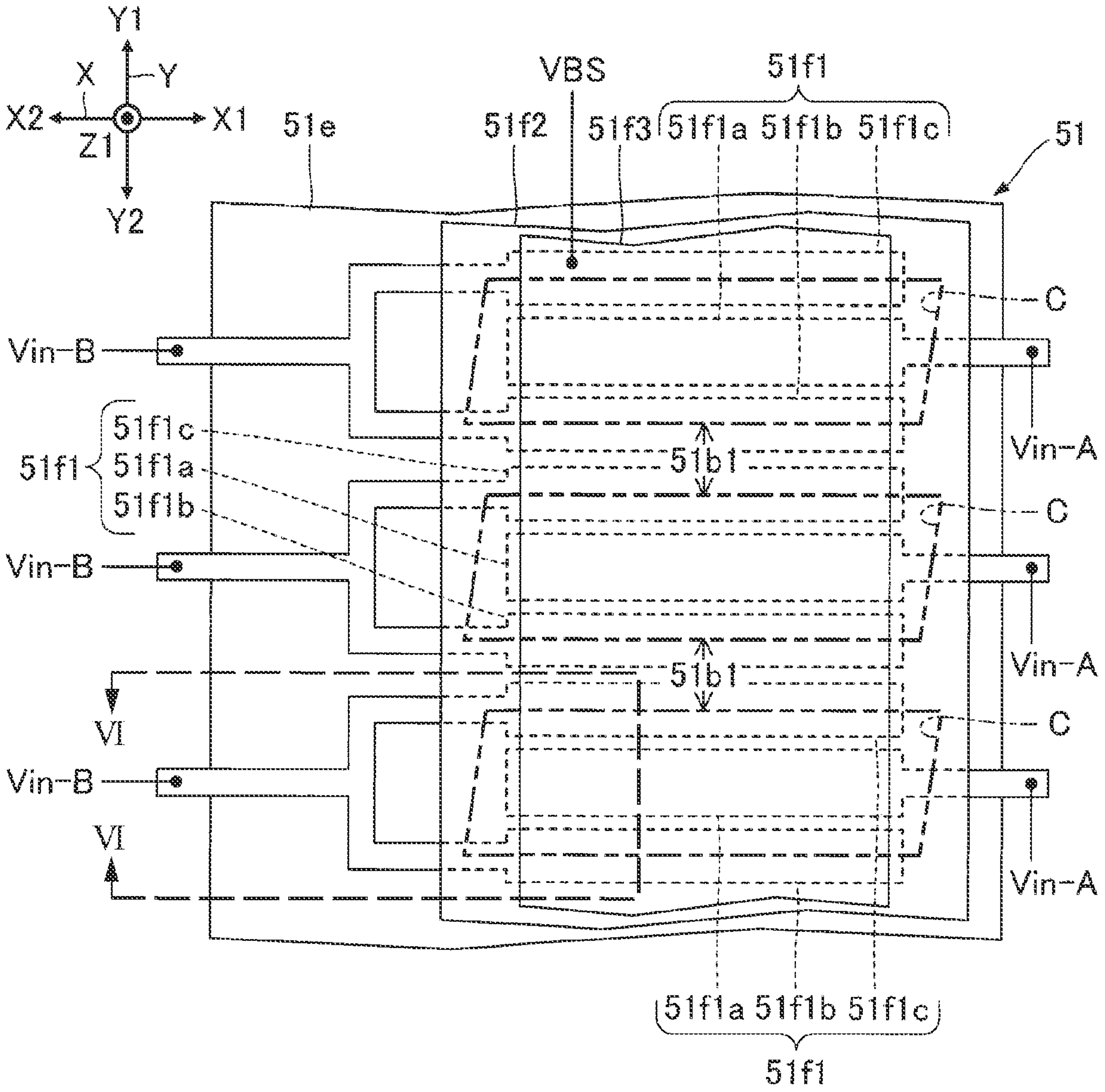
FIG. 5 is a plan view of the head chip.
Figure 6:
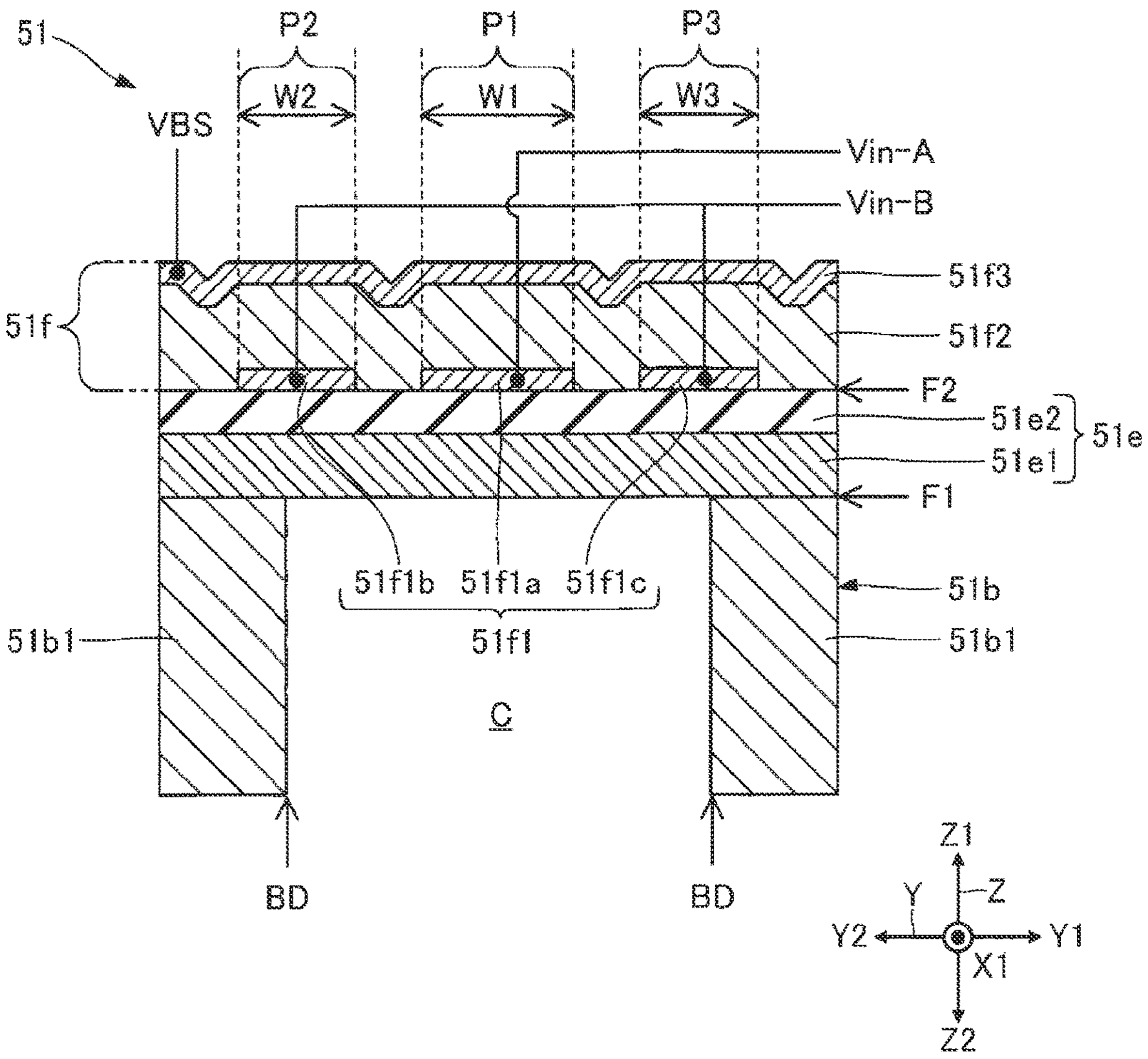
FIG. 6 is a cross-sectional view taken along the line VI-VI in FIG. 5.

FIG. 5 is a plan view of the head chip 51. FIG. 6 is a cross-sectional view taken along the line VI-VI in FIG. 5. In FIG. 5, a shape of the pressure chamber C in plan view is indicated by a two-dot chain line. A wall-shaped partition wall 51*b*1 extending along the X direction is provided between two adjacent pressure chambers C of the pressure chamber substrate 51*b*. The partition wall 51*b*1 partitions the pressure chamber C.

In the example illustrated in FIG. 5, the shape of the pressure chamber C in plan view is a parallelogram. Such a shape of the pressure chamber C in plan view is formed, for example, by anisotropically etching a silicon single crystal substrate having a plane orientation (110).

As illustrated in FIG. 6, the diaphragm 51*e* includes a first surface F1 and a second surface F2 facing in the direction opposite to the first surface F1. In the example illustrated in FIG. 6, the thickness direction of the diaphragm 51*e* is the direction along the Z axis. Therefore, the first surface F1 is the surface of the diaphragm 51*e* facing the Z2 direction, and the second surface F2 is the surface of the diaphragm 51*e* facing the Z1 direction. The piezoelectric element 51*f* is disposed on the second surface F2. The pressure chamber substrate 51*b* is disposed on the first surface F1.

The diaphragm 51*e* includes the first layer 51*e*1 and the second layer 51*e*2, which are laminated in this order in the Z1 direction. The first layer 51*e*1 is, for example, an elastic film made of silicon oxide ($SiO_2$). The second layer 51*e*2 is, for example, an insulating film made of zirconium oxide ($ZrO_2$).

The first layer 51*e*1 is not limited to silicon oxide. In addition, a part or all of the diaphragm 51*e* may be integrally made of the same material as that of the pressure chamber substrate 51*b*. In addition, the diaphragm 51*e* may be made of a layer of single material.

As illustrated in FIG. 5, the piezoelectric element 51*f* overlaps the pressure chamber C in plan view. As illustrated in FIG. 6, the piezoelectric element 51*f* includes a first electrode layer 51*f*1, a piezoelectric layer 51*f*2, and a second electrode layer 51*f*3, which are laminated in this order in the Z1 direction.

Another layer such as a layer for enhancing adhesion may be appropriately interposed between the layers of the piezoelectric element 51*f* or between the piezoelectric element 51*f* and the diaphragm 51*e*. In addition, a seed layer that improves the orientation of the piezoelectric layer 51*f*2 may be provided between the first electrode layer 51*f*1 and the piezoelectric layer 51*f*2.

The first electrode layer 51*f*1 includes individual electrodes 51*f*1*a*, 51*f*1*b*, and 51*f*1*c* for each piezoelectric element 51*f*. Each of the individual electrodes 51*f*1*a*, 51*f*1*b*, and 51*f*1*c* extends in the direction along the X axis. The individual electrodes 51*f*1*a*, 51*f*1*b*, and 51*f*1*c* are arranged in the direction along the Y axis at intervals from each other.

Here, the individual electrode 51*f*1*a* is disposed in the central portion of the pressure chamber C in the width direction and overlaps the center of the pressure chamber C in plan view. The first drive signal Com-A is supplied to the individual electrode 51*f*1*a* through the wiring. On the other hand, each of the individual electrode 51*f*1*b* and the individual electrode 51*f*1*c* is disposed at an end portion of the pressure chamber C in the width direction, and overlaps the pressure chamber C at a position closer to the outer edge BD of the pressure chamber C than the individual electrode 51*f*1*a* in plan view. The second drive signal Com-B is supplied to each of the individual electrode 51*f*1*b* and the individual electrode 51*f*1*c* through the wiring.

The first electrode layer 51*f*1 includes, for example, a first layer made of titanium (Ti), a second layer made of platinum (Pt), and a third layer made of iridium (Ir), which are laminated in this order in the Z1 direction.

Here, the first layer described above of the first electrode layer 51*f*1 functions as an adhesion layer that improves adhesion of the first electrode layer **51*f*1 to the diaphragm 51*e***. Although the thickness of the first layer is not particularly limited, the thickness is, for example, approximately 3 nm or more and 50 nm or less. The constituent material of the first layer is not limited to titanium, and for example, chromium may be used instead of titanium.

In addition, platinum forming the second layer described above and iridium forming the third layer of the first electrode layer **51*f*1 are both electrode materials with excellent conductivity and have chemical properties close to each other. Therefore, the characteristics of the first electrode layer 51*f*1** as an electrode can be improved. Although the thickness of the second layer is not particularly limited, the thickness is, for example, approximately 50 nm or more and 200 nm or less. Although the thickness of the third layer is not particularly limited, the thickness is, for example, approximately 4 nm or more and 20 nm or less.

The configuration of the first electrode layer **51*f*1** is not limited to the example described above. For example, either the second layer or the third layer described above may be omitted, or a layer made of iridium may be further provided between the first layer and the second layer described above. In addition, a layer made of an electrode material other than iridium and platinum may be used instead of the second layer and third layer or in addition to the second layer and third layer. Examples of the electrode material include metal materials such as aluminum (Al), nickel (Ni), gold (Au), and copper (Cu).

The piezoelectric layer **51*f*2 is disposed between the first electrode layer 51*f*1 and the second electrode layer 51*f*3. The piezoelectric layer 51*f*2 has a strip shape extending in the direction along the Y axis so as to be continuous over the plurality of piezoelectric elements 51*f*. The piezoelectric layer 51*f*2 may be provided individually for each piezoelectric element 51*f* or for each active portion P1, P2, and P3**.

The piezoelectric layer **51*f*2 is made of a piezoelectric material having a perovskite crystal structure represented by the general composition formula $ABO_3$. Examples of the piezoelectric material include known materials such as lead titanate ($PbTiO_3$) and lead zirconate titanate ($Pb(Zr,Ti)O_3$). In addition, the piezoelectric material forming the piezoelectric layer 51*f*2** may be a non-lead material such as barium titanate.

For example, the piezoelectric layer **51*f*2 is formed by forming a piezoelectric precursor layer by a liquid phase method such as a sol-gel method or a metal organic decomposition (MOD) method, and then firing and crystallizing the precursor layer. Here, the piezoelectric layer 51*f*2 may be configured to include a single layer, but when being configured to include a plurality of layers, even in a case in which the thickness of the piezoelectric layer 51*f*2 is increased, there is an advantage that the characteristics of the piezoelectric layer 51*f*2** are likely to be improved.

The second electrode layer **51*f*3 is a strip-shaped common electrode that extends in the direction along the Y axis so as to be continuous over the plurality of piezoelectric elements 51*f*. The offset potential VBS is supplied as a predetermined reference voltage to the second electrode layer 51*f*3**.

The second electrode layer **51*f*3** includes, for example, a layer made of iridium (Ir) and a layer made of titanium (Ti), which are laminated in this order in the Z1 direction.

The constituent material of the second electrode layer **51*f*3** is not limited to iridium and titanium, and may be, for example, metal materials such as platinum (Pt), aluminum (Al), nickel (Ni), gold (Au), and copper (Cu).

The above piezoelectric element **51*f* includes the active portions P1, P2, and P3. The active portion P1 is a portion of the piezoelectric element 51*f* where the individual electrode 51*f*1*a*, the piezoelectric layer 51*f*2, and the second electrode layer 51*f*3 all overlap when viewed in the thickness direction of the diaphragm 51*e*. The active portion P2 is a portion of the piezoelectric element 51*f* where the individual electrode 51*f*1*b*, the piezoelectric layer 51*f*2, and the second electrode layer 51*f*3 all overlap when viewed in the thickness direction of the diaphragm 51*e*. The active portion P3 is a portion of the piezoelectric element 51*f* where the individual electrode 51*f*1*c*, the piezoelectric layer 51*f*2, and the second electrode layer 51*f*3 all overlap when viewed in the thickness direction of the diaphragm 51*e***.

The active portion P1 is disposed between the active portion P2 and the active portion P3. In the example illustrated in FIG. 6, the active portion P2, the active portion P1, and the active portion P3 are arranged in this order in the Y1 direction. In addition, each of the active portions P1, P2, and P3 extends in the direction along the X axis.

Here, the active portion P1 overlaps the center of the pressure chamber C and does not overlap the outer edge BD of the pressure chamber C when viewed in the thickness direction of the diaphragm **51*e*. On the other hand, each of the active portion P2 and the active portion P3 overlaps the pressure chamber C at a position closer to the outer edge BD of the pressure chamber C than the active portion P1 when viewed in the thickness direction of the diaphragm 51*e*. In the example illustrated in FIG. 6, each of the active portion P2 and the active portion P3 is disposed across the pressure chamber C and the partition wall 51*b*1 and overlaps the outer edge BD, when viewed in the thickness direction of the diaphragm 51*e***.

The width W1 of the active portion P1 along the Y axis is smaller than the width of the pressure chamber C along the Y axis, and preferably smaller than the width of the pressure chamber C along the Y axis and ½ or more of the width of the pressure chamber C along the Y axis. In addition, the width W2 of the active portion P2 along the Y axis is smaller than the width of the pressure chamber C along the Y axis, and preferably ½ or less of the width of the pressure chamber C along the Y axis. Similarly, the width W3 of the active portion P3 along the Y axis is smaller than the width of the pressure chamber C along the Y axis, and preferably ½ or less of the width of the pressure chamber C along the Y axis. Here, the width W2 and width W3 may be equal to or different from each other.

1-5. Configuration of Switching Circuit

Figure 7:
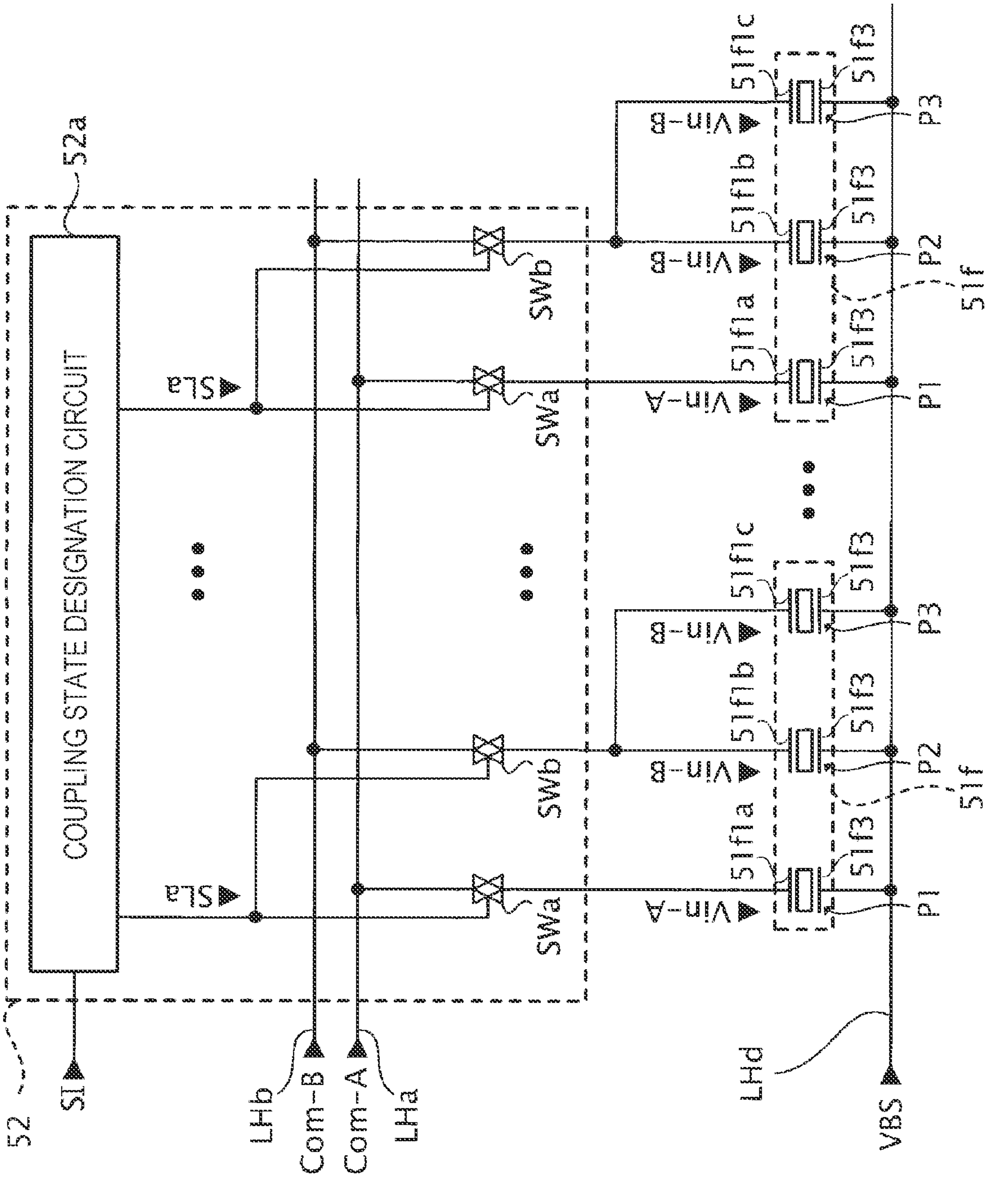
FIG. 7 is a diagram for describing a switching circuit.

FIG. 7 is a diagram for describing the switching circuit 52. The switching circuit 52 will be described below with reference to FIG. 7.

As illustrated in FIG. 7, the switching circuit 52 is coupled to the wiring LHa and the wiring LHb. The wiring LHa is a signal line that transmits the first drive signal Com-A. The wiring LHb is a signal line that transmits the second drive signal Com-B. In addition, the wiring LHd is coupled to the second electrode layer **51*f*3 of the piezoelectric element 51*f***. The wiring LHd is a power supply line to which the offset potential VBS is supplied.

The switching circuit 52 includes a plurality of switches SWa and a plurality of switches SWb corresponding one-to-one with the plurality of piezoelectric elements **51*f*, and a coupling state designation circuit 52*a*** that designates the coupling state of these switches.

The switch SWa is a switch that switches between conduction (on) and non-conduction (off) between the wiring LHa for transmitting the first drive signal Com-A and the individual electrode **51*f*1*a* of the piezoelectric element 51*f*. The switch SWb is a switch that switches between conduction (on) and non-conduction (off) between the wiring LHa for transmitting the second drive signal Com-B and the individual electrode 51*f*1***b* and the individual electrode 51*f*1*c* of the piezoelectric element 51*f*. Each of these switches is, for example, a transmission gate.

The coupling state designation circuit 52*a* generates a coupling state designation signal SLa designating on/off of the plurality of switches SWa and the plurality of switches SWb based on the clock signal CLK, the print data signal SI, the latch signal LAT, and the change signal CNG supplied from the control circuit 21.

For example, although not illustrated, the coupling state designation circuit 52*a* includes a plurality of transfer circuits, a plurality of latch circuits, and a plurality of decoders so as to correspond one-to-one with the plurality of piezoelectric elements 51*f*. Among these circuits, the print data signal SI is supplied to the transfer circuit. Here, the print data signal SI includes an individual designation signal for each piezoelectric element 51*f*, and the individual designation signal is serially supplied to the print data signal SI. For example, the individual designation signal is sequentially transferred to the plurality of transfer circuits in synchronization with the clock signal CLK. In addition, the latch circuit latches the individual designation signal supplied to the transfer circuit based on the latch signal LAT. In addition, the decoder also generates a coupling state designation signal SLa based on the individual designation signal, the latch signal LAT, and the change signal CNG.

On/off of the switch SWa and the switch SWb is switched according to the coupling state designation signal SLa generated as described above. For example, the switch SWa and the switch SWb are turned on when the coupling state designation signal SLa is at high level, and turned off when the coupling state designation signal SLa is at low level. As described above, the switching circuit 52 supplies a part or all of the waveform included in the first drive signal Com-A as the supply signal Vin-A, and a part or all of the waveform included in the second drive signal Com-B as the supply signal Vin-B to the one or more piezoelectric elements 51*f* selected from the plurality of piezoelectric elements 51*f*.

1-6. First Drive Signal and Second Drive Signal

Figure 8:
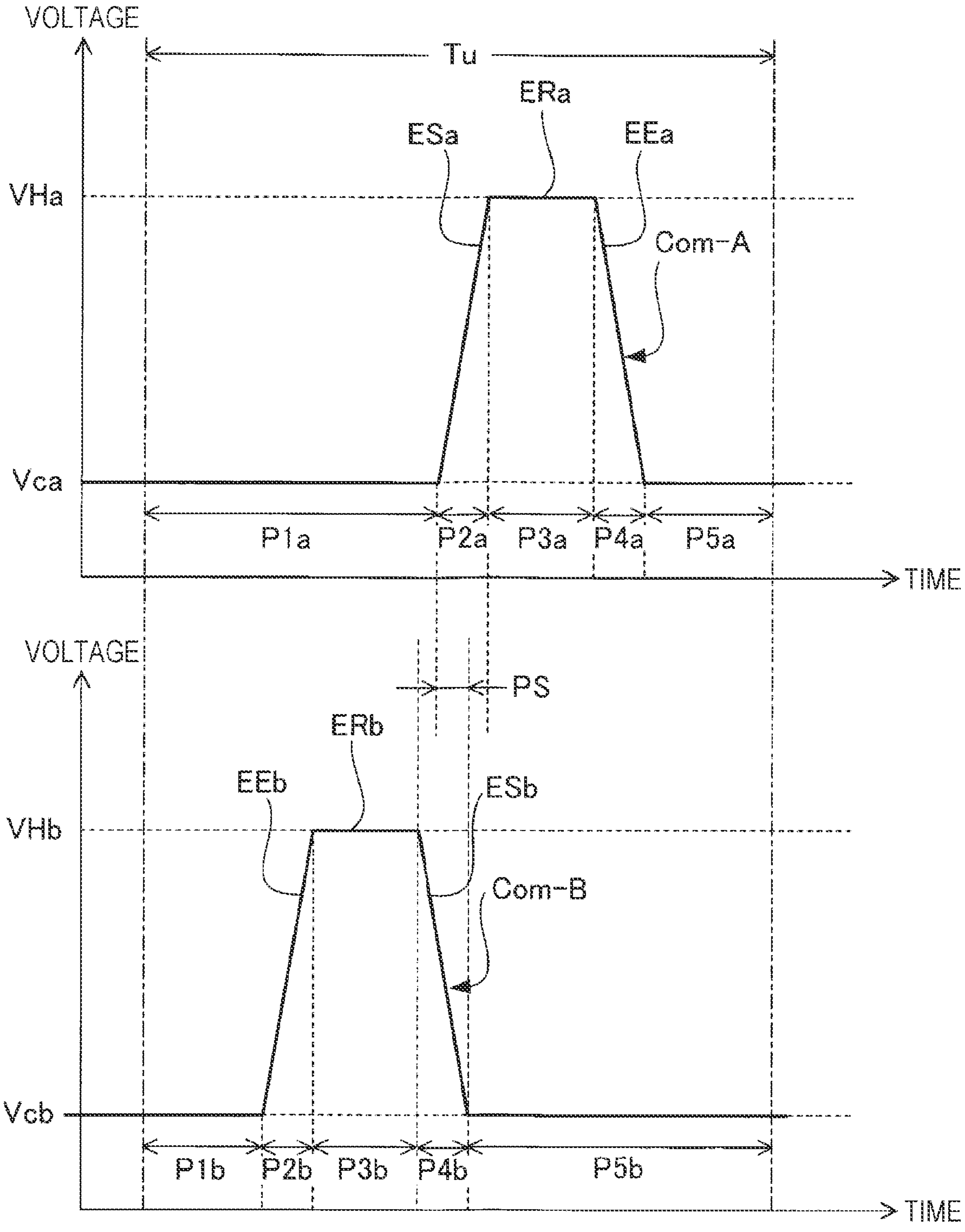
FIG. 8 is a graph for describing a first drive signal and a second drive signal in the first embodiment.

FIG. 8 is a graph for describing the first drive signal Com-A and the second drive signal Com-B in the first embodiment. The vertical axis "voltage" in the upper part of FIG. 8 is the potential difference between the first drive signal Com-A and the offset potential VBS, and the vertical axis "voltage" in the lower part of FIG. 8 is the potential difference between the second drive signal Com-B and the offset potential VBS. The vertical axis "voltage" in the upper part of FIG. 8 may be the potential of the first drive signal Com-A, and the vertical axis "voltage" in the lower part of FIG. 8 may be the potential of the second drive signal Com-B.

As illustrated in FIG. 8, each of the first drive signal Com-A and the second drive signal Com-B has a waveform that changes per unit period Tu of a predetermined cycle. The unit period Tu is defined by the latch signal LAT described above and the like, and corresponds to a print cycle in which dots are formed on the medium M by ink from the nozzles N.

In the example illustrated in FIG. 8, the first drive signal Com-A has a waveform that uses the intermediate potential Vca as a reference potential and returns from the intermediate potential Vca to the intermediate potential Vca via the potential VHa within the unit period Tu. Here, the intermediate potential Vca is an example of the "first potential" and the "fifth potential", and is a potential equal to or lower than the offset potential VBS, for example. The potential VHa is an example of the "second potential", a potential higher than the offset potential VBS, and a potential higher than the intermediate potential Vca.

Here, the potential of the first drive signal Com-A is maintained at the intermediate potential Vca for the period P1*a*, rises from the intermediate potential Vca to the potential VHa for the period P2*a*, is maintained at the potential VHa for the period P3*a*, drops from the potential VHa to the intermediate potential Vca for the period P4*a*, and is maintained at the intermediate potential Vca for the period P5*a*. The period P2*a* is an example of the "first period". The period P3*a* is an example of the "first holding period". The period P4*a* is an example of the "third period". The period P1*a*, the period P2*a*, the period P3*a*, the period P4*a*, and the period P5*a* are included in this order from the start point to the end point of the unit period Tu.

A waveform portion of the period P2*a* of the first drive signal Com-A described above is a shrinkage element ESa that shrinks the volume of the pressure chamber C. The shrinkage element ESa is an example of the "first shrinkage element". A waveform portion of the period P3*a* of the first drive signal Com-A is a holding element ERa, which is an example of the "first holding element". A waveform portion of the period P4*a* of the first drive signal Com-A is an expansion element EEa that expands the volume of the pressure chamber C.

On the other hand, the second drive signal Com-B has a waveform that uses the intermediate potential Vcb as a reference potential and returns from the intermediate potential Vcb to the intermediate potential Vcb via the potential VHb within the unit period Tu. Here, the intermediate potential Vcb is an example of the "third potential" and the "sixth potential", and is a potential equal to or lower than the offset potential VBS, for example. The potential VHb is an example of the "fourth potential", a potential higher than the offset potential VBS, and a potential higher than the intermediate potential Vcb.

Here, the potential of the second drive signal Com-B is maintained at the intermediate potential Vcb for the period P1*b*, rises from the intermediate potential Vcb to the potential VHb for the period P2*b*, is maintained at the potential VHb for the period P3*b*, drops from the potential VHb to the intermediate potential Vcb for the period P4*b*, and is maintained at the intermediate potential Vcb for the period P5*b*. The period P4*b* is an example of the "second period". The period P3*b* is an example of the "second holding period". The period P2*b* is an example of the "fourth period". The period P1*b*, the period P2*b*, the period P3*b*, the period P4*b*, and the period P5*b* are included in this order from the start point to the end point of the unit period Tu.

The waveform portion of the period P2*b* of the second drive signal Com-B described above is an expansion element EEb that expands the volume of the pressure chamber C. A waveform portion of the period P3*b* of the second drive signal Com-B is a holding element ERb, which is an example of the "second holding element". A waveform portion of the period P4*b* of the second drive signal Com-B is a shrinkage element ESb that shrinks the volume of the pressure chamber C. The shrinkage element ESb is an example of the "second shrinkage element".

In the present embodiment, the waveforms of the first drive signal Com-A and the second drive signal Com-B are substantially the same as each other. However, in the first drive signal Com-A and the second drive signal Com-B, phases to which waveforms are supplied are shifted from each other. The fact that "the waveforms are substantially the same as each other" means that the patterns match when waveforms based on electrical noise and errors are removed.

That is, the length of the period P1*a* of the first drive signal Com-A is longer than the length of the period P1*b* of the second drive signal Com-B. The length of the period P2*a* of the first drive signal Com-A and the length of the period P2*b* of the second drive signal Com-B are equal to each other. The length of the period P3*a* of the first drive signal Com-A and the length of the period P3*b* of the second drive signal Com-B are equal to each other. The length of the period P4*a* of the first drive signal Com-A and the length of the period P4*b* of the second drive signal Com-B are equal to each other. The length of the period P5*a* of the first drive signal Com-A is shorter than the length of the period P5*b* of the second drive signal Com-B.

The waveforms of the first drive signal Com-A and the second drive signal Com-B may be different from each other. However, when the waveforms of the first drive signal Com-A and the second drive signal Com-B are substantially the same as each other, the drive signal generation circuit 24 may generate one waveform and supply the waveform by shifting the phase. Therefore, there is an advantage that the configuration of the drive signal generation circuit 24 can be simplified compared to the case where the waveforms of the first drive signal Com-A and the second drive signal Com-B are different from each other.

The start timing of the period P3*a* of the first drive signal Com-A is later than the end timing of the period P3*b* of the second drive signal Com-B.

Here, at least a part of the period P2*a* of the first drive signal Com-A and at least a part of the period P4*b* of the second drive signal Com-B temporally overlap each other in the period PS.

In the example illustrated in FIG. 8, the start timing of the period P2*a* is later than the start timing of the period P4*b* within the unit period Tu. Accordingly, the end timing of the period P2*a* is later than the end timing of the period P4*b* within the unit period Tu.

1-7. Shrinkage Step

Figure 9:
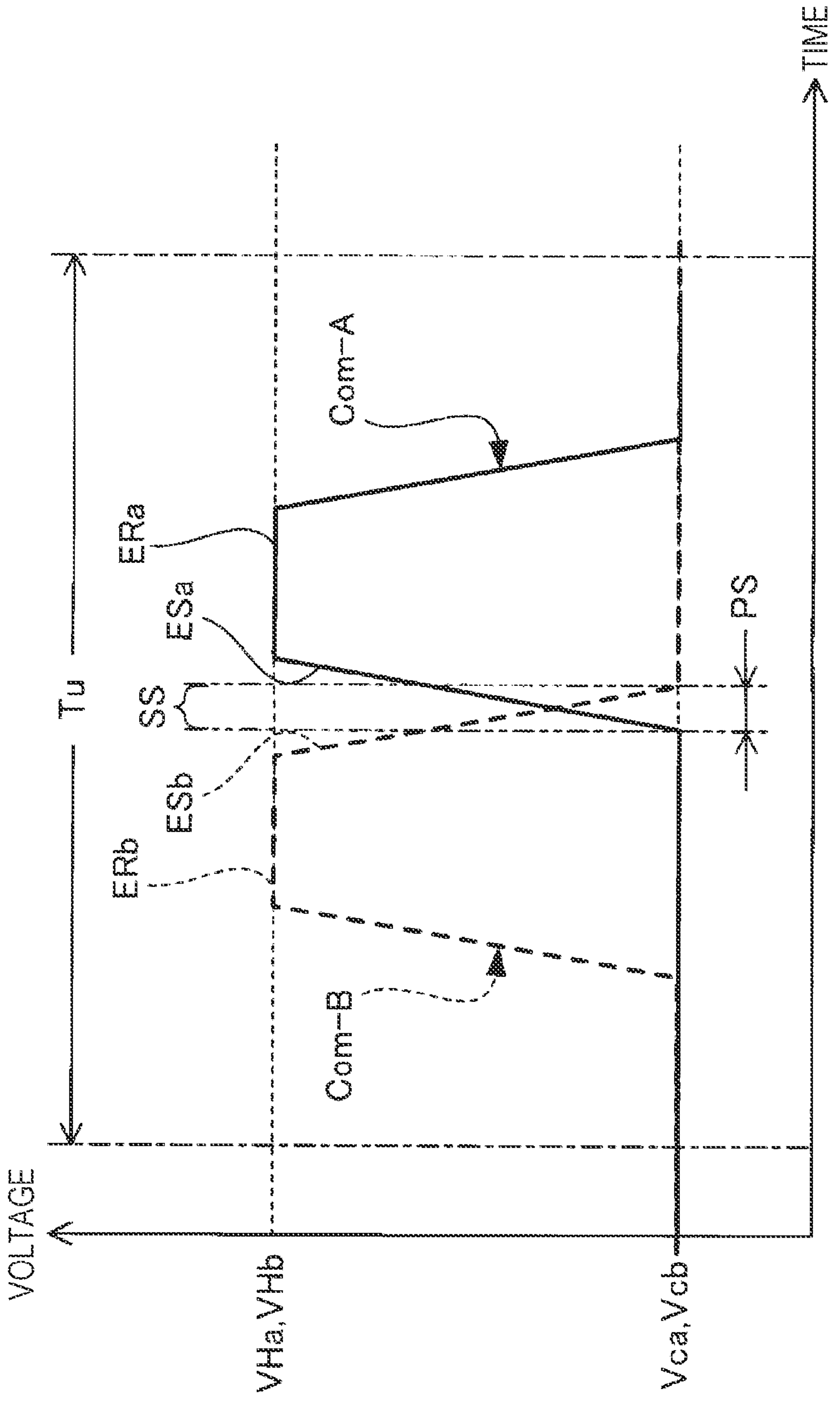
FIG. 9 is a graph for describing a shrinkage step in the first embodiment.

FIG. 9 is a graph for describing the shrinkage step SS in the first embodiment. In FIG. 9, the first drive signal Com-A is indicated by a solid line, and the second drive signal Com-B is indicated by a broken line. In the example illustrated in FIG. 9, the potential VHa and the potential VHb are equal to each other, and the intermediate potential Vca and the intermediate potential Vcb are equal to each other.

The potential VHa and the potential VHb may be different from each other, and the intermediate potential Vca and the intermediate potential Vcb may be different from each other. However, when the potential VHa and the potential VHb are equal to each other and the intermediate potential Vca and the intermediate potential Vcb are also equal to each other, there is an advantage that the configuration of the drive signal generation circuit 24 can be simplified as compared to the case where the potentials are not equal.

As described above, after the holding element ERb of the second drive signal Com-B is supplied to the active portions P2 and P3, the supply of the holding element ERa of the first drive signal Com-A to the active portion P1 is started through the period PS. Here, the shrinkage step SS is executed in the period PS.

Figure 10:
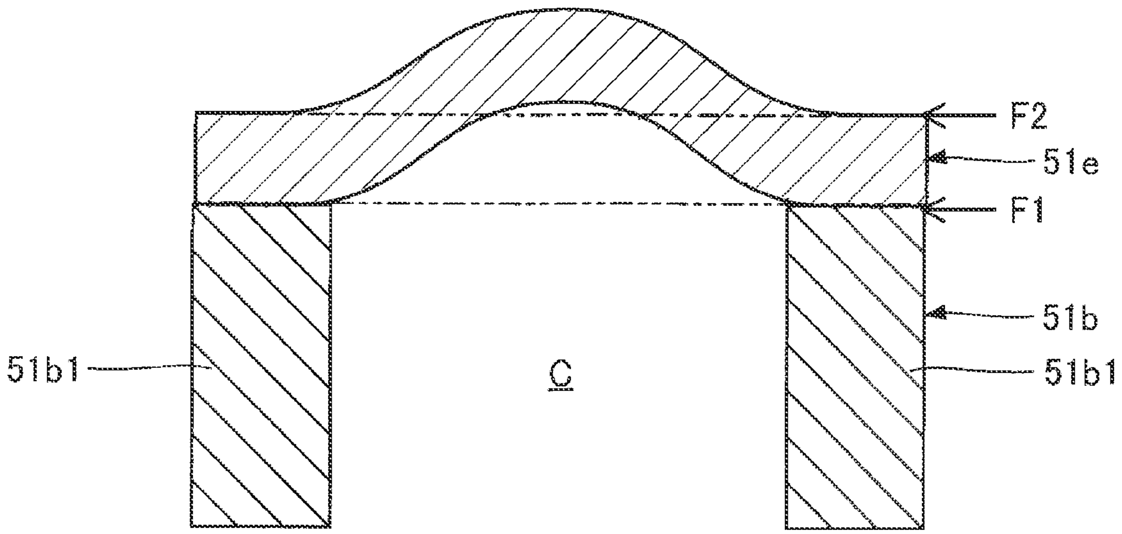
FIG. 10 is a schematic diagram for describing deformation of a diaphragm due to the first drive signal.
Figure 11:
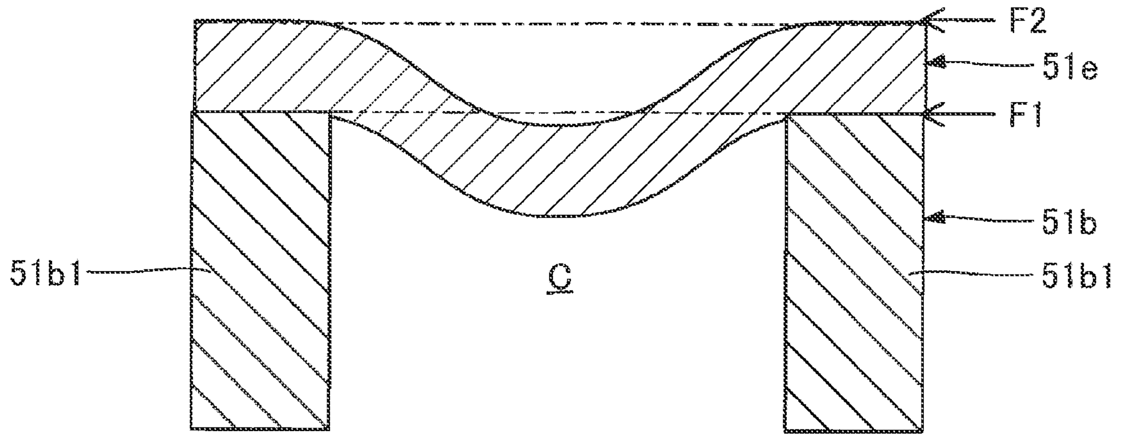
FIG. 11 is a schematic diagram for describing deformation of the diaphragm due to the second drive signal.

FIG. 10 is a schematic diagram for describing deformation of the diaphragm 51*e* due to the first drive signal Com-A. FIG. 11 is a schematic diagram for describing deformation of the diaphragm due to the second drive signal Com-B. In these figures, for convenience of explanation, the illustration of the piezoelectric element 51F is omitted and the diaphragm 51*e* is schematically illustrated. In addition, in FIGS. 10 and 11, the diaphragm 51*e* in a natural state, which is a reference state, is indicated by a two-dot chain line. The "natural state of the diaphragm 51*e*" refers to the state of the diaphragm 51*e* when no voltage is applied to the piezoelectric element 51*f*.

When a voltage is applied in the direction along the Z axis, the active portions P1, P2, and P3 all try to shrink in the direction perpendicular to the Z axis as the active portions extend in the direction along the Z axis. At this time, since the surface of each of the active portions P1, P2, and P3 facing the Z2 direction is fixed to the diaphragm 51*e*, the amount of shrinkage of the surfaces of the active portions P1, P2, and P3 facing the Z2 direction is smaller than the amount of shrinkage of the surfaces of the active portions P1, P2, and P3 facing the Z1 direction. Therefore, the active portions P1, P2, and P3 are deformed so as to warp in the direction along the Z axis, and accordingly the diaphragm 51*e* is also deformed.

Here, among both ends of each of the active portions P2 and P3 in the direction along the Y axis, an end of the pressure chamber C on a side closer to the partition wall 511 is restricted in displacement by the partition wall 511, whereas an end of the pressure chamber C on a side farther from the partition wall 511 is unlikely to be restricted in displacement. Therefore, when the active portions P2 and P3 try to shrink in the direction along the Y axis, the ends on the far side are displaced in the Z1 direction. As a result, the diaphragm 51*e* is deformed so that the first surface F1 is recessed. Therefore, when the holding element ERb of the second drive signal Com-B is supplied to the active portions P2 and P3, the diaphragm 51*e* deforms so that the first surface F1 is recessed as illustrated in FIG. 10. As a result, the volume of the pressure chamber C expands.

On the other hand, both ends of the active portion P1 in the direction along the Y axis are located relatively far from the partition wall 511 of the pressure chamber C, and are unlikely to be restricted by the partition wall 511 of displacement. Therefore, when the active portion P1 tries to shrink in the direction along the Y axis, the diaphragm 51*e* deforms so that the first surface F1 is projected. Therefore, when the holding element ERa of the first drive signal Com-A is supplied to the active portion P1, the diaphragm 51*e* deforms so that the first surface F1 is projected as illustrated in FIG. 11. As a result, the volume of the pressure chamber C shrinks.

Here, the active portions P2 and P3 try to return the diaphragm 51*e* from the state indicated by the solid line to the state indicated by the two-dot chain line in FIG. 10 during the period of receiving the supply of the shrinkage element ESb of the second drive signal Com-B. In addition, the active portion P1 tries to deform the diaphragm 51*e* from the state indicated by the two-dot chain line to the state indicated by the solid line in FIG. 11 during the period of receiving the supply of the shrinkage element ESa of the first drive signal Com-A.

In the shrinkage step SS, when deforming the diaphragm 51*e* from the state indicated by the two-dot chain line to the state indicated by the solid line in FIG. 11, it is possible to use a force that tries to return the diaphragm 51*e* from the state indicated by the solid line to the state indicated by the two-dot chain line in FIG. 10. That is, in the shrinkage step SS, when the active portion P1 deforms the diaphragm 51*e* from the reference state to the state where the volume of the pressure chamber C is shrunk, it is possible to use a force that tries to return the diaphragm 51*e* to the reference state from the state where the volume of the pressure chamber C is expanded by the active portions P2 and P3. Therefore, the amount of deformation of the diaphragm 51*e* can be increased compared to a configuration in which only the active portion P1 is driven by the first drive signal Com-A. As a result, ink can be discharged from the nozzles N efficiently.

On the other hand, in a case in which the start timing of supply of the shrinkage element ESa of the first drive signal Com-A to the active portion P1 match or is later than the end timing of supply to the active portions P2 and P3, when deforming the diaphragm 51*e* from the state indicated by the two-dot chain line in FIG. 11 to the state indicated by the solid line, it is not possible to use the force that tries to return the diaphragm 51*e* from the state indicated by the solid line in FIG. 10 to the state indicated by the two-dot chain line, and the above effect cannot be obtained.

As described above, the liquid discharge apparatus 100 is provided with the diaphragm 51*e*, the pressure chamber substrate 51*b*, the piezoelectric element 51*f*, and the drive signal generation circuit 24 which is an example of the "drive signal generation portion". Here, as described above, the diaphragm 51*e* includes the first surface F1 and the second surface F2 facing in the direction opposite to the first surface F1. The pressure chamber substrate 51*b* includes a partition wall 51*b*1 that is laminated on the first surface F1 and partitions the pressure chambers C communicating with the nozzles N discharging ink as an example of "liquid". The piezoelectric element 51*f* is laminated on the second surface F2 and includes the active portion P1 as an example of the "first active portion" and the active portion P2 as an example of the "second active portion". The active portion P1 overlaps the center of the pressure chamber C when viewed in the thickness direction of the diaphragm 51*e*. The active portion P2 overlaps the pressure chamber C at a position closer to the outer edge of the pressure chamber C than the active portion P1 when viewed in the thickness direction of the diaphragm 51*e*. The drive signal generation circuit 24 generates a first drive signal Com-A for driving the active portion P1 and a second drive signal Com-B for driving the active portion P2.

The first drive signal Com-A includes a shrinkage element ESa, which is an example of the "first shrinkage element", per periodic unit period Tu. On the other hand, the second drive signal Com-B includes a shrinkage element ESb, which is an example of the "second shrinkage element", per unit period Tu. Each of the shrinkage element ESa and the shrinkage element ESb shrinks the volume of the pressure chamber C. The liquid discharge apparatus 100 executes the shrinkage step SS. The shrinkage step SS is a period during which a period P2*a*, which is an example of the "first period", and a period P4*b*, which is an example of the "second period", overlap each other. In the period P2*a*, the shrinkage element ESa is supplied to the active portion P1. In the period P4*b*, the shrinkage element ESb is supplied to the active portion P2.

Here, the period P2*a* is a period during which the intermediate potential Vca, which is an example of the "first potential", changes to the potential VHa, which is an example of the "second potential", per unit period Tu. In addition, the period P4*b* is a period during which the intermediate potential Vcb, which is an example of the "third potential", changes to the potential VHb, which is an example of the "fourth potential", per unit period Tu.

In the liquid discharge apparatus 100 described above, since the period P2*a* and the period P4*b* overlap each other in the shrinkage step SS, compared to a configuration in which these periods do not overlap each other, the displacement amount of the diaphragm 51*e* can be increased and the displacement speed of the diaphragm 51*e* can be increased. Therefore, it is possible to increase the discharge speed of the ink from the nozzle N and increase the amount of ink discharged from the nozzle N per one discharge. In addition, by increasing the displacement speed of the diaphragm 51*e*, the ink discharge cycle from the nozzles N can be shortened. As described above, the discharge characteristics of the liquid discharge apparatus 100 can be improved.

Here, as described above, during execution of the shrinkage step SS, a magnitude relationship between the potentials of the first drive signal Com-A and the second drive signal Com-B is reversed. That is, during the period during which the period P2*a* and the period P4*b* overlap each other, a magnitude relationship between the voltages of the first drive signal Com-A and the second drive signal Com-B is reversed.

Furthermore, as described above, the start timing of the shrinkage element ESa is later than the start timing of the shrinkage element ESb in the unit period Tu. That is, the start timing of the period P2*a* is later than the start timing of the period P4*b* in the unit period Tu. Therefore, excessive stress is prevented from being generated between the portion of the diaphragm 51*e* deformed by the active portion P1 and the portion of the diaphragm 51*e* deformed by the active portion P2. As a result, damage such as cracks in the diaphragm 51*e* can be reduced.

In addition, as described above, the end timing of the shrinkage element ESa is later than the end timing of the shrinkage element ESb in the unit period Tu. Therefore, in the unit period Tu, the start timing of the shrinkage element ESa can be later than the start timing of the shrinkage element ESb.

Furthermore, as described above, the piezoelectric element 51*f* further includes an active portion P3, which is an example of the "third active portion". The active portion P3 overlaps the pressure chamber C at a position closer to the outer edge of the pressure chamber C than the active portion P1 when viewed in the thickness direction of the diaphragm 51*e*. The active portion P1 is located between the active portion P2 and the active portion P3 when viewed in the thickness direction of the diaphragm 51*e*. Therefore, the active portion P3 can function similarly to the active portion P2.

In addition, as described above, the piezoelectric element 51*f* includes the first electrode layer 51*f*1, the piezoelectric layer 51*f*2, and the second electrode layer 51*f*3 in this order in the direction away from the diaphragm 51*e*. The piezoelectric layer 51*f*2 and the second electrode layer 51*f*3 are commonly provided over the active portion P1, the active portion P2, and the active portion P3. On the other hand, the first electrode layer 51*f*1 includes a plurality of individual electrodes 51*f*1*a*, 51*f*1*b*, and 51*f*1*c* individually provided in the active portion P1, the active portion P2, and the active portion P3. Therefore, wiring routing can be simplified compared to a configuration in which an individual electrode is provided for each active portion in the second electrode layer 51*f*3. In addition, the manufacturing of the piezoelectric layer 51*f*2 can be simplified compared to a configuration in which the piezoelectric layer 51*f*2 is divided for each active portion.

2. Second Embodiment

Hereinafter, a second embodiment of the present disclosure will be described. Hereinafter, the description will focus on differences from the first embodiment.

Figure 12:
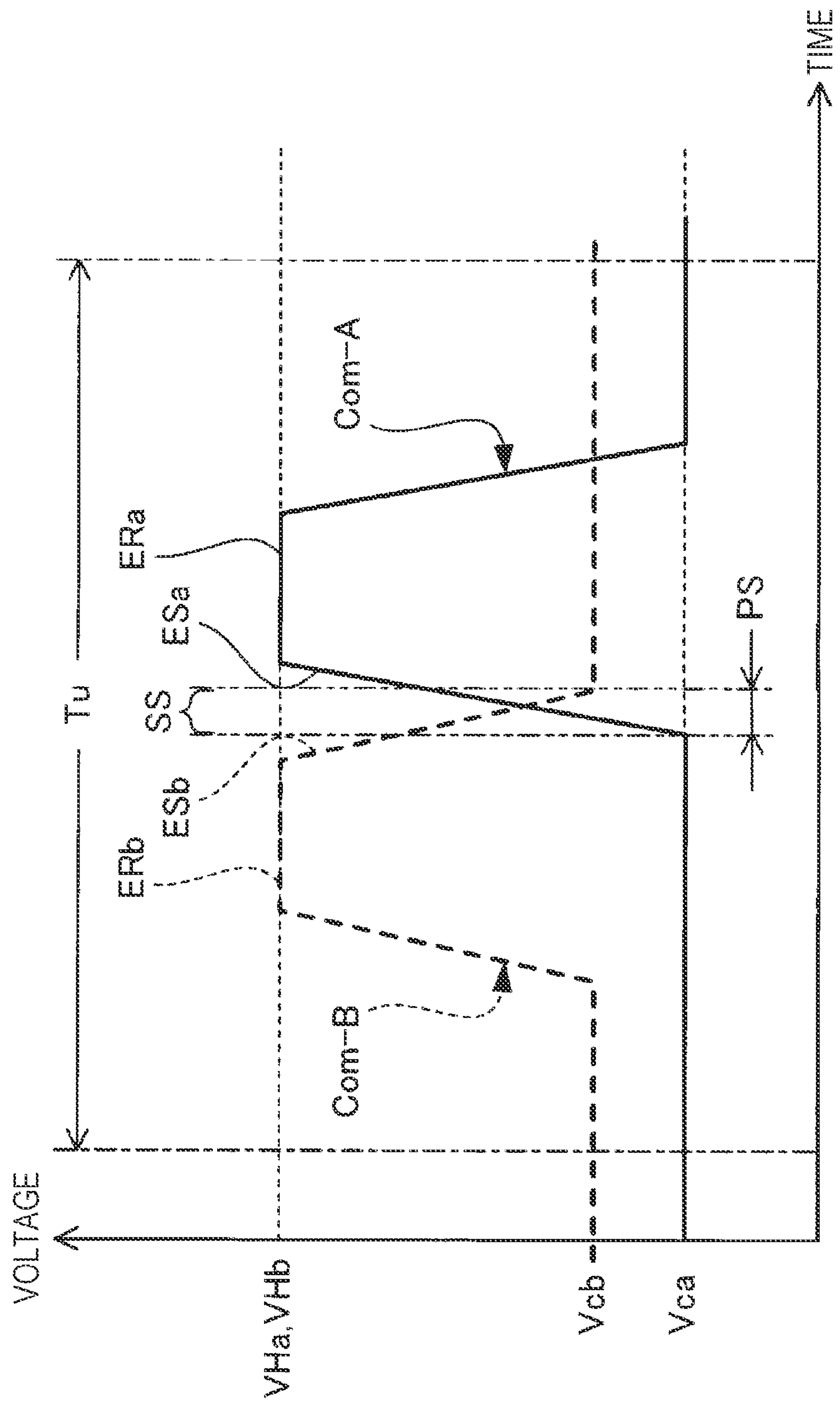
FIG. 12 is a graph for describing a shrinkage step in a second embodiment.

FIG. 12 is a diagram for describing the shrinkage step SS in the second embodiment. As illustrated in FIG. 12, the present embodiment is the same as the first embodiment described above except that the intermediate potential Vcb of the second drive signal Com-B is higher than the intermediate potential Vca of the first drive signal Com-A.

According to the second embodiment described above, the discharge characteristics of the liquid discharge apparatus 100 can also be improved. In the present embodiment, as described above, the intermediate potential Vcb is higher than the intermediate potential Vca. Therefore, by appropriately setting the difference between these potentials, it is possible to adjust the hardness and the like of the diaphragm 51*e*. As a result, the discharge characteristics of the plurality of head chips 51 can be made uniform even when there are manufacturing variations.

3. Third Embodiment

Hereinafter, a third embodiment of the present disclosure will be described. Hereinafter, the description will focus on differences from the first embodiment.

Figure 13:
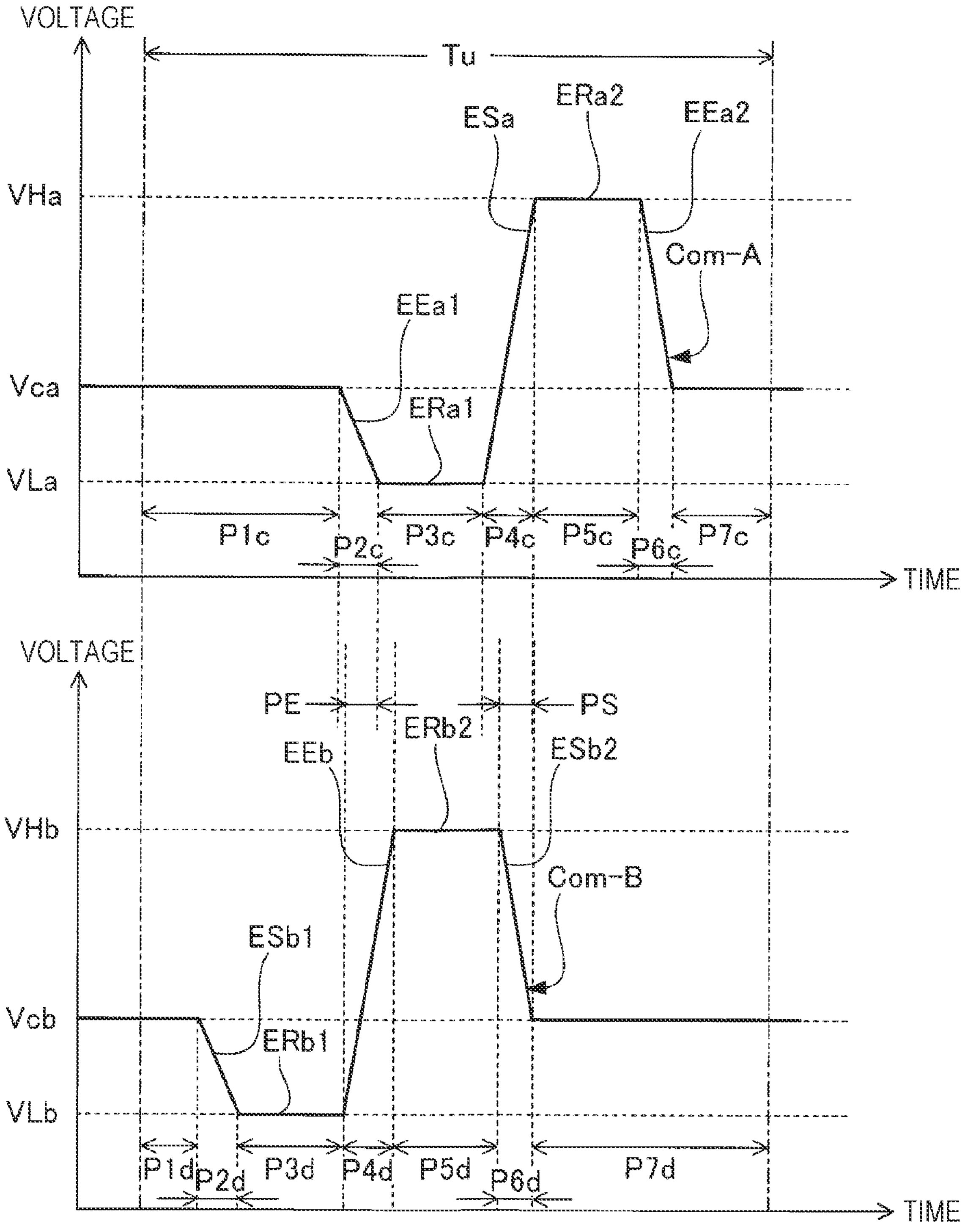
FIG. 13 is a graph for describing a first drive signal and a second drive signal in a third embodiment.

FIG. 13 is a diagram for describing the first drive signal Com-A and the second drive signal Com-B in the third embodiment. In the example illustrated in FIG. 13, the first drive signal Com-A has a waveform that uses the intermediate potential Vca as a reference potential and returns from the intermediate potential Vca to the intermediate potential Vca via the potential VLa and the potential VHa in this order within the unit period Tu. The potential VLa is a potential lower than the intermediate potential Vca.

Here, the potential of the first drive signal Com-A is maintained at the intermediate potential Vca for the period Plc, drops from the intermediate potential Vca to the potential VLa for the period P2*c*, is maintained at the potential VLa for the period P3*c*, rises from the potential VLa to the potential VHa for the period P4*c*, is maintained at the potential VHa for the period P5*c*, drops from the potential VHa to the intermediate potential Vca for the period P6*c*, and is maintained at the intermediate potential Vca for the period P7*c*. The period P2*c* is an example of the "third period". The period P4*c* is an example of the "first period". The period Plc, the period P2*c*, the period P3*c*, the period P4*c*, the period P5*c*, the period P6*c*, and the period P7*c* are included in this order from the start point to the end point of the unit period Tu.

The waveform portion of the period P2*c* of the first drive signal Com-A described above is the expansion element EEa1 that expands the volume of the pressure chamber C. The expansion element EEa1 is an example of the "first expansion element". A waveform portion of the period P3*c* of the first drive signal Com-A is a holding element ERa1. A waveform portion of the period P4*c* of the first drive signal Com-A is the shrinkage element ESa that shrinks the volume of the pressure chamber C. The shrinkage element ESa is an example of the "first shrinkage element". A waveform portion of the period P5*c* of the first drive signal Com-A is a holding element ERa2. A waveform portion of the period P6*c* of the first drive signal Com-A is the expansion element EEa2 that expands the volume of the pressure chamber C.

On the other hand, the second drive signal Com-B illustrated in FIG. 13 has a waveform that uses the intermediate potential Vcb as a reference potential and returns from the intermediate potential Vcb to the intermediate potential Vcb via the potential VLb and the potential VHb in this order within the unit period Tu. The potential VLb is a potential lower than the intermediate potential Vcb.

Here, the potential of the second drive signal Com-B is maintained at the intermediate potential Vcb for the period P1*d*, drops from the intermediate potential Vcb to the potential VLb for the period P2*d*, is maintained at the potential VLb for the period P3*d*, rises from the potential VLb to the potential VHb for the period P4*d*, is maintained at the potential VHb for the period P5*d*, drops from the potential VHb to the intermediate potential Vcb for the period P6*d*, and is maintained at the intermediate potential Vcb for the period P7*d*. The period P4*d* is an example of the "fourth period". The period P6*d* is an example of the "second period". The period P1*d*, the period P2*d*, the period P3*d*, the period P4*d*, the period P5*d*, the period P6*d*, and the period P7*d* are included in this order from the start point to the end point of the unit period Tu.

The waveform portion of the period P2*d* of the second drive signal Com-B described above is the shrinkage element ESb1 that shrinks the volume of the pressure chamber C. A waveform portion of the period P3*d* of the second drive signal Com-B is a holding element ERb1. A waveform portion of the period P4*d* of the second drive signal Com-B is the expansion element EEb that expands the volume of the pressure chamber C. The expansion element EEb is an example of the "second expansion element". A waveform portion of the period P5*d* of the second drive signal Com-B is a holding element ERb2. A waveform portion of the period P6*d* of the second drive signal Com-B is the shrinkage element ESb2 that shrinks the volume of the pressure chamber C. The shrinkage element ESb2 is an example of the "second shrinkage element".

In the present embodiment, the waveforms of the first drive signal Com-A and the second drive signal Com-B are substantially the same as each other. However, in the first drive signal Com-A and the second drive signal Com-B, phases to which waveforms are supplied are shifted from each other.

Here, the length of the period Plc of the first drive signal Com-A is longer than the length of the period P1*d* of the second drive signal Com-B. The length of the period P2*c* of the first drive signal Com-A and the length of the period P2*d* of the second drive signal Com-B are equal to each other. The length of the period P3*c* of the first drive signal Com-A and the length of the period P3*d* of the second drive signal Com-B are equal to each other. The length of the period P4*c* of the first drive signal Com-A and the length of the period P4*d* of the second drive signal Com-B are equal to each other. The length of the period P5*c* of the first drive signal Com-A and the length of the period P5*d* of the second drive signal Com-B are equal to each other. The length of the period P6*c* of the first drive signal Com-A and the length of the period P6*d* of the second drive signal Com-B are equal to each other. The length of the period P7*c* of the first drive signal Com-A is shorter than the length of the period P7*d* of the second drive signal Com-B.

The waveforms of the first drive signal Com-A and the second drive signal Com-B may be different from each other. However, when the waveforms of the first drive signal Com-A and the second drive signal Com-B are the same as each other, the drive signal generation circuit 24 may generate one waveform and supply the waveform by shifting the phase. Therefore, there is an advantage that the configuration of the drive signal generation circuit 24 can be simplified compared to the case where the waveforms of the first drive signal Com-A and the second drive signal Com-B are different from each other.

The start timing of the period P3*c* of the first drive signal Com-A is later than the end timing of the period P3*d* of the second drive signal Com-B. Similarly, the start timing of the period P5*c* of the first drive signal Com-A is later than the end timing of the period P5*d* of the second drive signal Com-B.

Here, at least a part of the period P2*c* of the first drive signal Com-A and at least a part of the period P4*d* of the second drive signal Com-B temporally overlap each other in the period PE.

In the example illustrated in FIG. 13, the start timing of the period P2*c* is earlier than the start timing of the period P4*d* within the unit period Tu. In addition, within the unit period Tu, the end timing of the period P2*c* is earlier than the end timing of the period P4*d*. Within the unit period Tu, the start timing of the period P2*c* may be after the start timing of the period P4*d*, and the end timing of the period P2*c* may be after the end timing of the period P4*d*.

In addition, at least a part of the period P4*c* of the first drive signal Com-A and at least a part of the period P6*d* of the second drive signal Com-B temporally overlap each other in the period PS.

In the example illustrated in FIG. 13, the start timing of the period P4*c* is earlier than the start timing of the period P6*d* within the unit period Tu. In addition, within the unit period Tu, the end timing of the period P2*c* is earlier than the end timing of the period P4*d*. Within the unit period Tu, the start timing of the period P4*c* may be after the start timing of the period P6*d*, and the end timing of the period P2*c* may be after the end timing of the period P4*d*.

Figure 14:
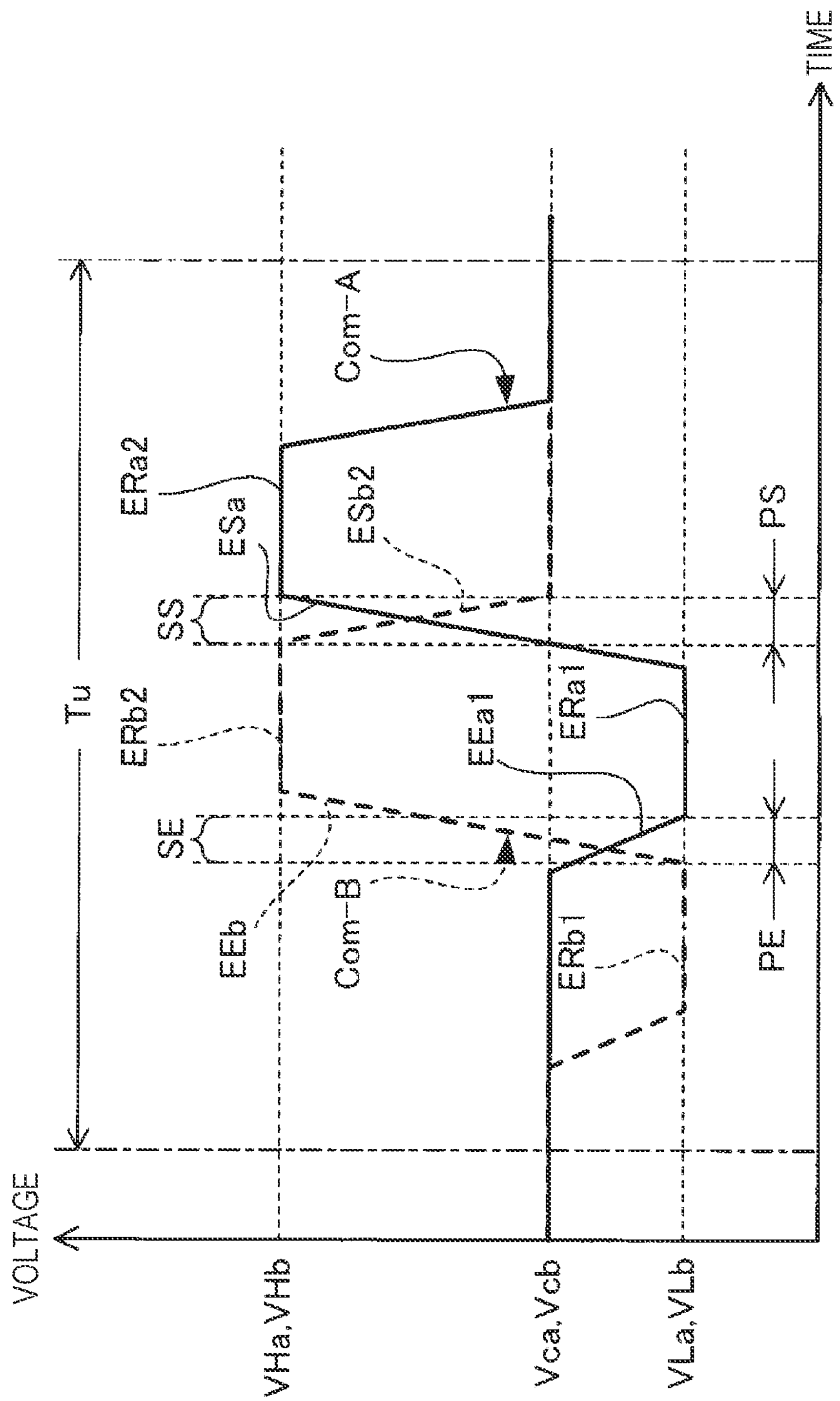
FIG. 14 is a graph for describing a shrinkage step and an expansion step in the third embodiment.

FIG. 14 is a diagram for describing the shrinkage step SS and the expansion step SE in the third embodiment. In FIG. 14, the first drive signal Com-A is indicated by a solid line, and the second drive signal Com-B is indicated by a broken line. In the example illustrated in FIG. 14, the potential VLa and the potential VLb are equal to each other, the potential VHa and the potential VHb are equal to each other, and the intermediate potential Vca and the intermediate potential Vcb are equal to each other.

The potential VLa and the potential VLb may be different from each other, the potential VHa and the potential VHb may be different from each other, and the intermediate potential Vca and the intermediate potential Vcb may be different from each other. However, when the potential VLa and the potential VLb are equal to each other, the potential VHa and the potential VHb are equal to each other, and the intermediate potential Vca and the intermediate potential Vcb are equal to each other, there is an advantage that the configuration of the drive signal generation circuit 24 can be simplified as compared to the case where the potentials are not equal.

As described above, after the holding element ERb1 of the second drive signal Com-B is supplied to the active portions P2 and P3, the supply of the holding element ERa1 of the first drive signal Com-A to the active portion P1 is started through the period PE. Here, the expansion step SE is executed in the period PE. The shrinkage step SS is the same as that of the first embodiment described above.

During the period during which the holding element ERb1 of the second drive signal Com-B is supplied to the active portions P2 and P3, the diaphragm 51*e* is deformed so that the first surface F1 is projected. As a result, the volume of the pressure chamber C is shrunk. On the other hand, during the period during which the holding element ERa1 of the first drive signal Com-A is supplied to the active portion P1, the diaphragm 51*e* is deformed so that the first surface F1 is recessed. As a result, the volume of the pressure chamber C expands.

As described above, in the expansion step SE in which the volume of the pressure chamber C changes from the shrunk state to the expanded state, when the active portion P1 deforms the diaphragm 51*e* from the reference state to a state where the volume of the pressure chamber C expands, it is possible to use a force that tries to return the diaphragm 51*e* to the reference state from the state where the active portions P2 and P3 shrink the volume of the pressure chamber C. Therefore, the amount of deformation of the diaphragm 51*e* can be increased compared to a configuration in which only the active portion P1 is driven by the first drive signal Com-A. As a result, ink can be discharged from the nozzles N efficiently.

According to the third embodiment described above, the discharge characteristics of the liquid discharge apparatus 100 can also be improved. In the present embodiment, as described above, the first drive signal Com-A includes the expansion element EEa1, which is an example of the "first expansion element". In addition, the second drive signal Com-B includes the expansion element EEb, which is an example of the "second expansion element". Each of the expansion element EEa1 and the expansion element EEb expands the volume of the pressure chamber C per unit period Tu. The liquid discharge apparatus 100 executes the expansion step SE. The expansion step SE is a period during which the period P2*c*, which is an example of the "third period", and the period P4*d*, which is an example of the "fourth period", overlap each other. In the period P2*c*, the expansion element EEa1 is supplied to the active portion P1. In the period P4*d*, the expansion element EEb is supplied to the active portions P2 and P3.

In the expansion step SE, the period P2*c* and the period P4*d* overlap each other, so that the momentum of the ink introduced into the pressure chamber C can be increased compared to a configuration in which these periods do not overlap. In addition, the ink discharge cycle from the nozzles N can be shortened compared to a configuration in which these periods do not overlap.

Here, as described above, the expansion step SE is executed before the shrinkage step SS in the unit period Tu. Therefore, the amount of ink discharged from the nozzle N per one discharge can be increased.

Furthermore, as described above, the period P4*c* and the period P4*d* do not overlap each other, and the period P2*c* and the period P6*d* do not overlap each other. Therefore, excessive stress is prevented from being generated between the portion of the diaphragm 51*e* deformed by the active portion P1 and the portion of the diaphragm 51*e* deformed by the active portion P2. As a result, damage such as cracks in the diaphragm 51*e* can be reduced.

4. Fourth Embodiment

Hereinafter, a fourth embodiment of the present disclosure will be described. Hereinafter, the description will focus on differences from the first embodiment.

Figure 15:
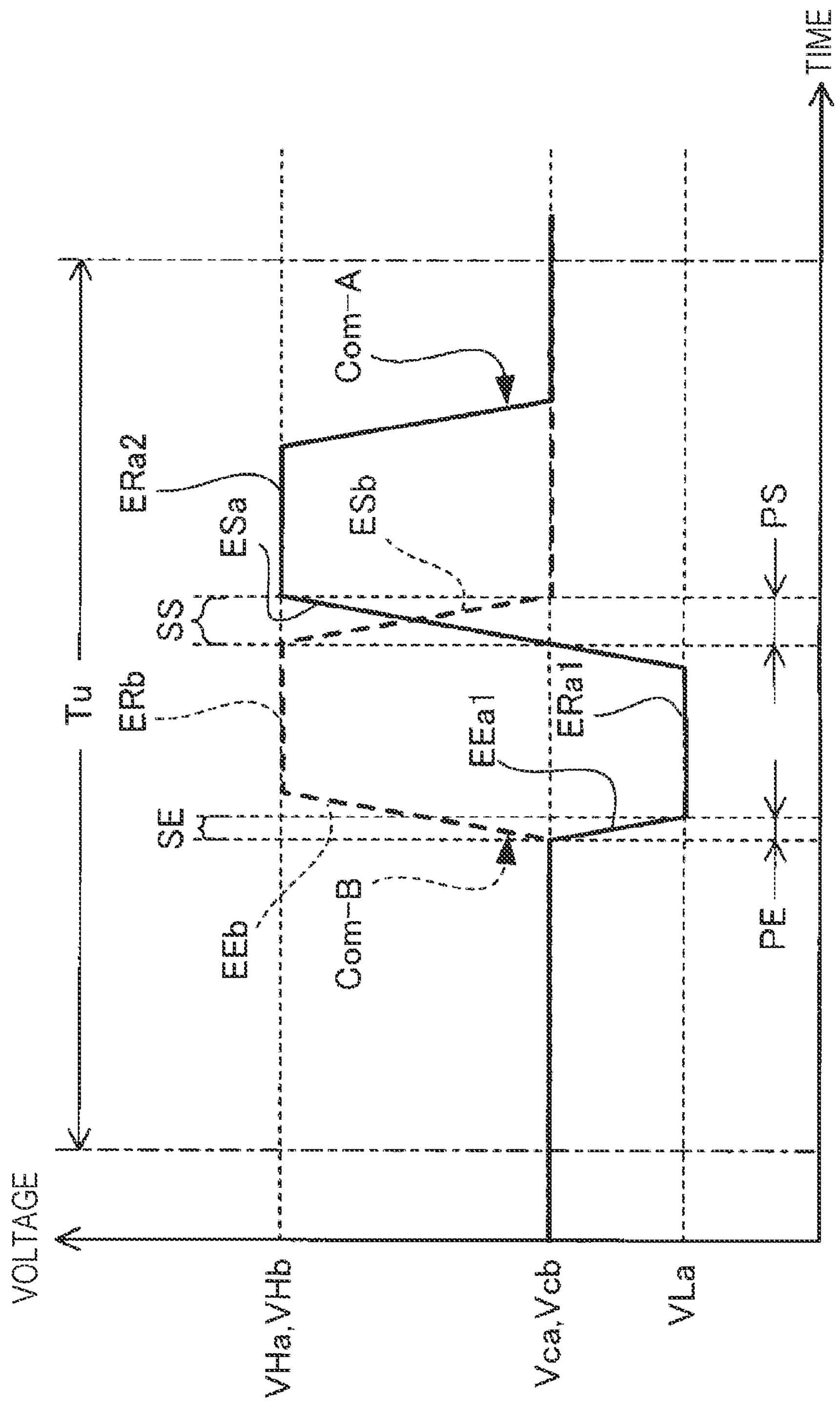
FIG. 15 is a graph for describing a shrinkage step and an expansion step in a fourth embodiment.

FIG. 15 is a diagram for describing the shrinkage step SS and the expansion step SE in the fourth embodiment. The present embodiment is the same as the third embodiment described above except that the shrinkage element ESb1 and the holding element ERb1 of the second drive signal Com-B are omitted. Therefore, the second drive signal Com-B of the present embodiment is the same as the second drive signal Com-B of the first embodiment.

According to the fourth embodiment described above, the discharge characteristics of the liquid discharge apparatus 100 can also be improved.

5. Fifth Embodiment

Hereinafter, a fifth embodiment of the present disclosure will be described. Hereinafter, the description will focus on differences from the first embodiment.

Figure 16:
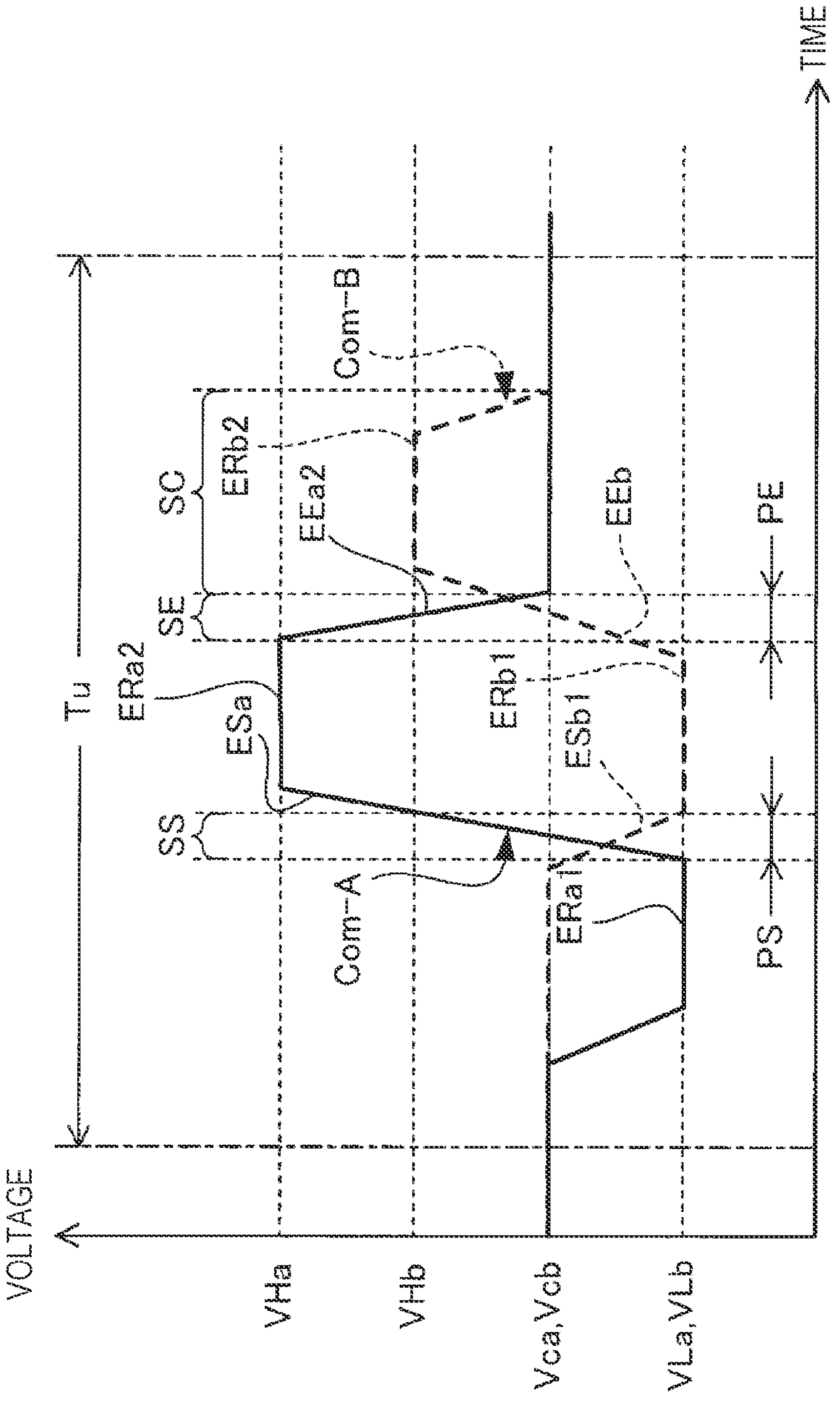
FIG. 16 is a graph for describing a shrinkage step, an expansion step, and a vibration damping step in a fifth embodiment.

FIG. 16 is a diagram for describing the shrinkage step SS, the expansion step SE, and the vibration damping step SC in the fifth embodiment. The present embodiment is the same as the third embodiment described above except that the phases of the first drive signal Com-A and the second drive signal Com-B are different.

In the present embodiment, the shrinkage step SS is executed by overlapping the period of the shrinkage element ESa of the first drive signal Com-A and the period of the shrinkage element ESb1 of the second drive signal Com-B in the period PS. In addition, the expansion step SE is executed by overlapping the period of the expansion element EEa2 of the first drive signal Com-A and the period of the expansion element EEb of the second drive signal Com-B in the period PE. Furthermore, after the expansion step SE, the vibration damping step SC is executed in which a damping force is applied to the diaphragm 51*e* by the holding element ERb2 of the second drive signal Com-B. It is preferable that the timing of the vibration damping step SC and the potential VHb of the vibration damping step SC are appropriately requested according to the vibration cycle and amplitude of the diaphragm 51*e* caused by the steps before the expansion step SE.

According to the fifth embodiment described above, the discharge characteristics of the liquid discharge apparatus 100 can also be improved. In the present embodiment, as described above, the expansion step SE is executed after the shrinkage step SS in the unit period Tu. Therefore, by executing the expansion step SE, ink can be supplied to the pressure chambers C in which the ink is decreased by executing the shrinkage step SS. In addition, after the active portion P1 is driven by the first drive signal Com-A, the vibration of the diaphragm 51*e* can be damped by executing the vibration damping step SC. As a result, the discharge cycle can be shortened while improving print quality.

6. Sixth Embodiment

Hereinafter, a sixth embodiment of the present disclosure will be described. Hereinafter, the description will focus on differences from the first embodiment.

Figure 17:
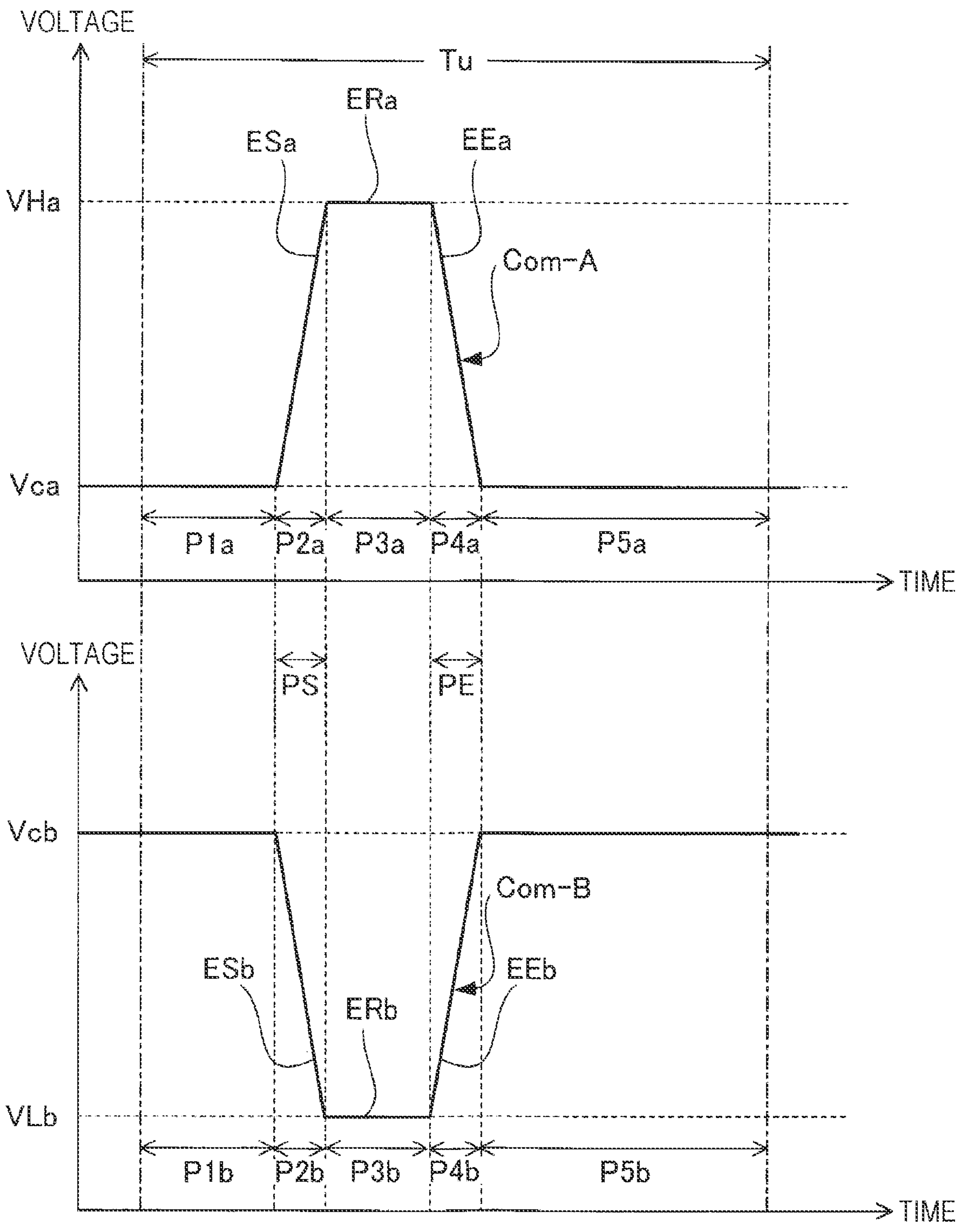
FIG. 17 is a graph for describing a first drive signal and a second drive signal in a sixth embodiment.

FIG. 17 is a diagram for describing the first drive signal Com-A and the second drive signal Com-B in the sixth embodiment. In the example illustrated in FIG. 17, the first drive signal Com-A is the same as the first drive signal COM-A of the first embodiment.

On the other hand, the second drive signal Com-B illustrated in FIG. 17 is a signal having a phase opposite to the first drive signal Com-A. That is, the second drive signal Com-B illustrated in FIG. 17 has a waveform that uses the intermediate potential Vcb as a reference potential and returns from the intermediate potential Vcb to the intermediate potential Vcb via the potential VLb within the unit period Tu. The intermediate potential Vcb is an example of the "third potential" and the "sixth potential". The potential VLb is an example of the "fourth potential".

Here, the potential of the second drive signal Com-B is maintained at the intermediate potential Vcb for the period P1*b*, drops from the intermediate potential Vcb to the potential VLb for the period P2*b*, is maintained at the potential VLb for the period P3*b*, rises from the potential VLb to the intermediate potential Vcb for the period P4*b*, and is maintained at the intermediate potential Vcb for the period P5*b*. The period P2*b* is an example of the "second period". The period P4*b* is an example of the "fourth period".

The waveform portion of the period P2*b* of the second drive signal Com-B described above is an example of the "second shrinkage element", and is the shrinkage element ESb that shrinks the volume of the pressure chamber C. A waveform portion of the period P3*b* of the second drive signal Com-B is a holding element ERb, which is an example of the "second holding element". A waveform portion of the period P4*b* of the second drive signal Com-B is an example of the "second expansion element" and is an expansion element EEb that expands the volume of the pressure chamber C.

Here, at least a part of the period P2*a* of the first drive signal Com-A and at least a part of the period P2*b* of the second drive signal Com-B temporally overlap each other in the period PS. In addition, at least a part of the period P4*a* of the first drive signal Com-A and at least a part of the period P4*b* of the second drive signal Com-B temporally overlap each other in the period PE. By providing such periods PS and PE, it is possible to improve discharge characteristics similarly to the other embodiments.

In the example illustrated in FIG. 17, the length of the period P1*a* and the length of the period P1*b* are equal to each other. The length of the period P2*a* and the length of the period P2*b* are equal to each other. The length of the period P3*a* and the length of the period P3*b* are equal to each other. The length of the period P4*a* and the length of the period P4*b* are equal to each other. The length of the period P5*a* and the length of the period P5*b* are equal to each other. When the waveforms of the first drive signal Com-A and the second drive signal Com-B have phases opposite to each other, there is an advantage that the configuration of the drive signal generation circuit 24 can be simplified as compared to the case where the waveforms are not in opposite phases.

In the example of FIG. 17, the length of the period P3*a* and the length of the period P3*b* are the same, but these lengths may be different from each other. That is, the length of the period P3*a* may be longer or shorter than the length of the period P3*b*. In this case, even when there is an error in the phases of the first drive signal Com-A and the second drive signal Com-B for some reason, there is an advantage that fluctuations in discharge characteristics can be easily reduced.

Figure 18:
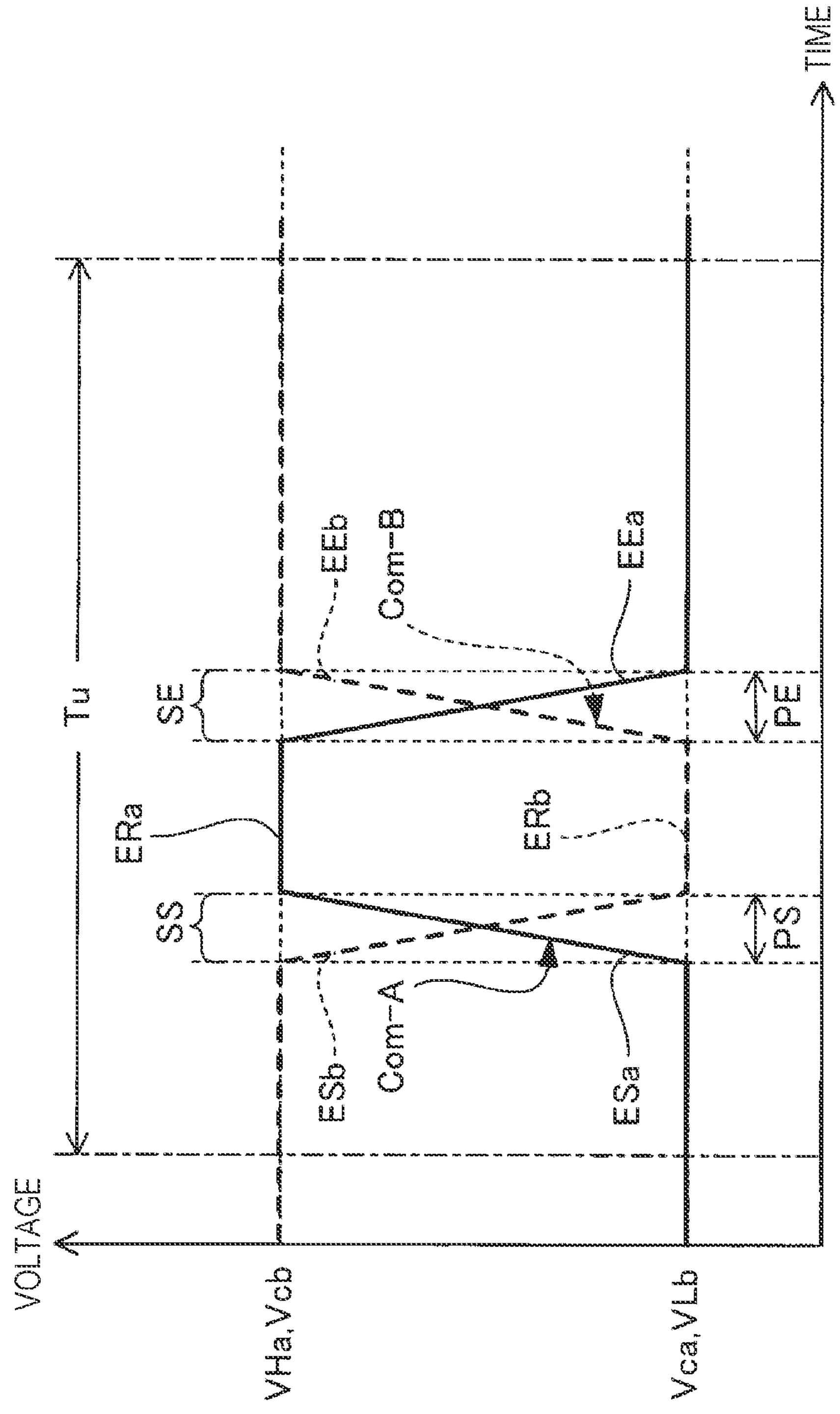
FIG. 18 is a graph for describing a shrinkage step and an expansion step in the sixth embodiment.

FIG. 18 is a diagram for describing the shrinkage step SS and the expansion step SE in the sixth embodiment. In FIG. 18, the first drive signal Com-A is indicated by a solid line, and the second drive signal Com-B is indicated by a broken line. In the example illustrated in FIG. 18, the potential VHa and the intermediate potential Vcb are equal to each other, and the intermediate potential Vca and the potential VLb are equal to each other.

The potential VHa and the intermediate potential Vcb may be different from each other, and the intermediate potential Vca and the potential VLb may be different from each other. However, when the potential VHa and the intermediate potential Vcb are equal to each other, and the intermediate potential Vca and the potential VLb are equal to each other, there is an advantage that the configuration of the drive signal generation circuit 24 can be simplified as compared to the case where the potentials are not equal.

In the period PS, the shrinkage step SS is executed. Thereafter, in the period PE, the expansion step SE is executed.

According to the sixth embodiment described above, the discharge characteristics of the liquid discharge apparatus 100 can also be improved, similarly to the first embodiment described above. In the present embodiment, as described above, the first drive signal Com-A includes the period P3*a* in which the voltage is held after the shrinkage element ESa as an example of the "first holding period". On the other hand, the second drive signal Com-B includes the period P3*b* in which the voltage is held after the shrinkage element ESb as an example of the "second holding period". Here, when the lengths of the period P3*a* and the period P3*b* are different from each other, even when some error occurs in the phases of the first drive signal Com-A and the second drive signal Com-B, the length of the period during which the period P3*a* and the period P3*b* overlap is unlikely to fluctuate. Therefore, it is possible to reduce variations in the amount of ink discharged from the nozzles N due to the error. On the other hand, when the lengths of the periods P3*a* and P3*b* are equal to each other, the length of the period during which the periods P3*a* and P3*b* overlap is likely to fluctuate due to the error. Therefore, the amount of ink discharged from the nozzles N is likely to vary. However, in this case, there is an advantage that the drive signal generation circuit 24 can be simplified.

In addition, as described above, the first drive signal Com-A and the second drive signal Com-B are signals having phases opposite to each other. Therefore, it is possible to reduce the influence of electrical noise (electrical crosstalk) between two discharge elements adjacent to each other. In addition, in this case, since each element included in the first drive signal Com-A and the second drive signal Com-B is executed at the same time, the time required for the unit period Tu can be shortened as a whole compared to the first to fifth embodiments.

Furthermore, as described above, the intermediate potential Vcb is higher than the intermediate potential Vca. Therefore, in a standby state where ink is not discharged from the nozzles N, the second drive signal Com-B maintains a state where the volume of the pressure chamber C is expanded. Therefore, since tension is applied to the diaphragm 51*e*, the spring constant of the diaphragm 51*e* can be increased. As a result, by shortening the natural vibration cycle of the diaphragm 51*e*, the ink discharge cycle from the nozzles N can be shortened.

In addition, as described above, the first drive signal Com-A includes a period P3*a* that is an example of the "first holding period" and a period P4*a* that is an example of the "third period" per unit period Tu. The period P3*a* follows the period P2*a*, which is an example of the "first period," and holds the potential VHa, which is an example of the "second potential". In the period P4*a* following the period P3*a*, the potential VHa changes to the intermediate potential Vca which is an example of the "fifth potential". On the other hand, the second drive signal Com-B includes a period P3*b* that is an example of the "second holding period" and a period P4*b* that is an example of the "fourth period" per unit period Tu. The period P3*b* follows the period P2*b*, which is an example of the "second period," and holds the potential VLb, which is an example of the "fourth potential". In the period P4*b*, following the period P3*b*, the potential VLb changes to the intermediate potential Vcb which is an example of the "sixth potential". The period P4*a* and the period P4*b* overlap each other. That is, the expansion step SE is executed. Therefore, the momentum of the ink introduced into the pressure chamber C can be increased. In addition, the ink discharge cycle from the nozzles N can be shortened.

Here, as described above, in the period PE in which the period P4*a* and the period P4*b* overlap each other, the magnitude relationship between the potentials of the first drive signal Com-A and the second drive signal Com-B is reversed.

7. Seventh Embodiment

Hereinafter, a seventh embodiment of the present disclosure will be described. Hereinafter, the description will focus on differences from the first embodiment.

Figure 19:
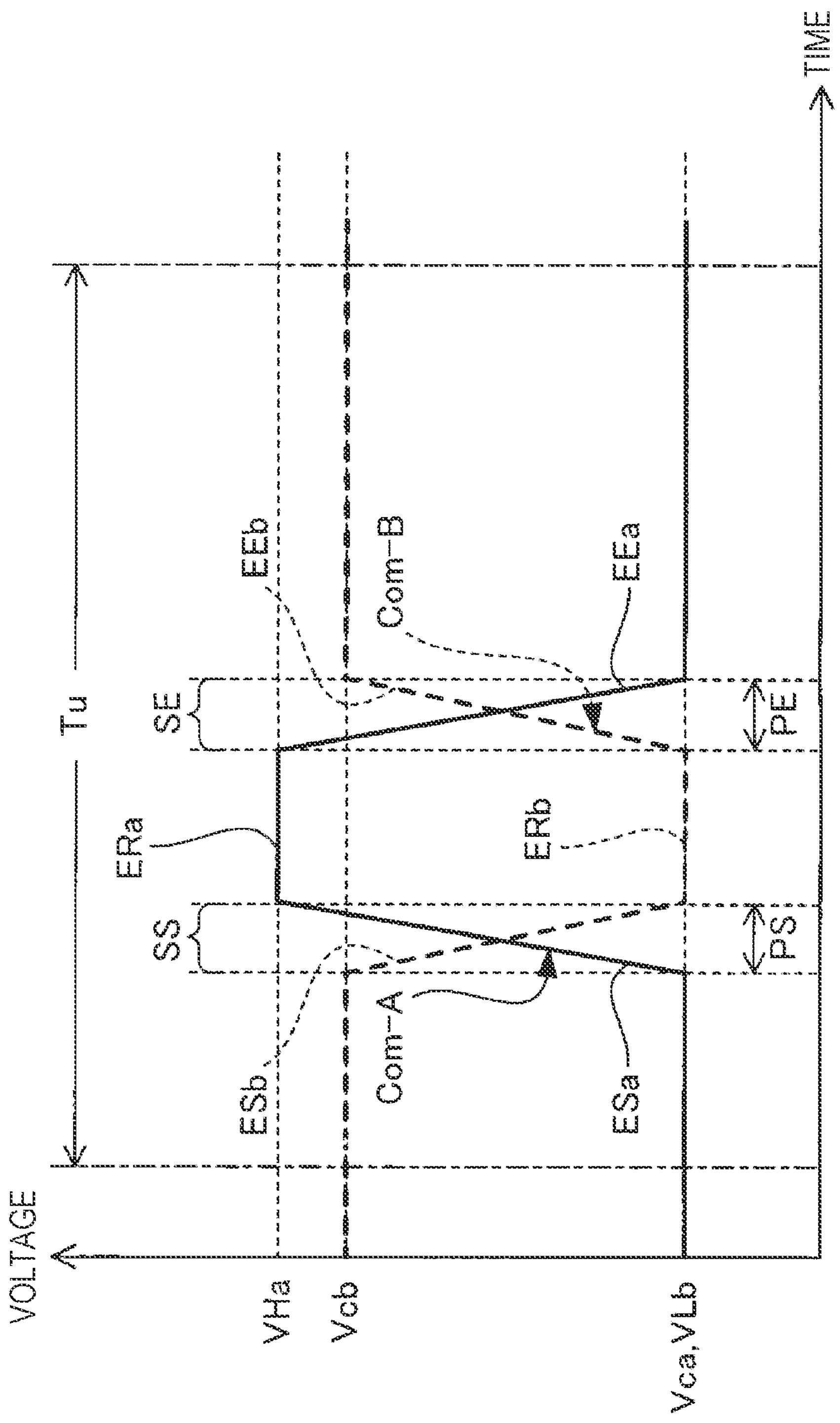
FIG. 19 is a graph for describing a shrinkage step and an expansion step in a seventh embodiment.

FIG. 19 is a diagram for describing the shrinkage step and the expansion step in the seventh embodiment. The present embodiment is the same as the sixth embodiment described above, except that the intermediate potential Vcb of the second drive signal Com-B is different from the potential VHa of the first drive signal Com-A as illustrated in FIG. 19.

According to the seventh embodiment described above, the discharge characteristics of the liquid discharge apparatus 100 can also be improved. In the present embodiment, as described above, the intermediate potential Vcb is different from the potential VHa. Therefore, by appropriately setting the intermediate potential Vcb, the hardness and the like of the diaphragm 51*e* can be adjusted. As a result, the discharge characteristics can be made uniform among the plurality of head chips 51 and among the plurality of pressure chambers C even when there are manufacturing variations.

8. Eighth Embodiment

Hereinafter, an eighth embodiment of the present disclosure will be described. Hereinafter, the description will focus on differences from the first embodiment.

Figure 20:
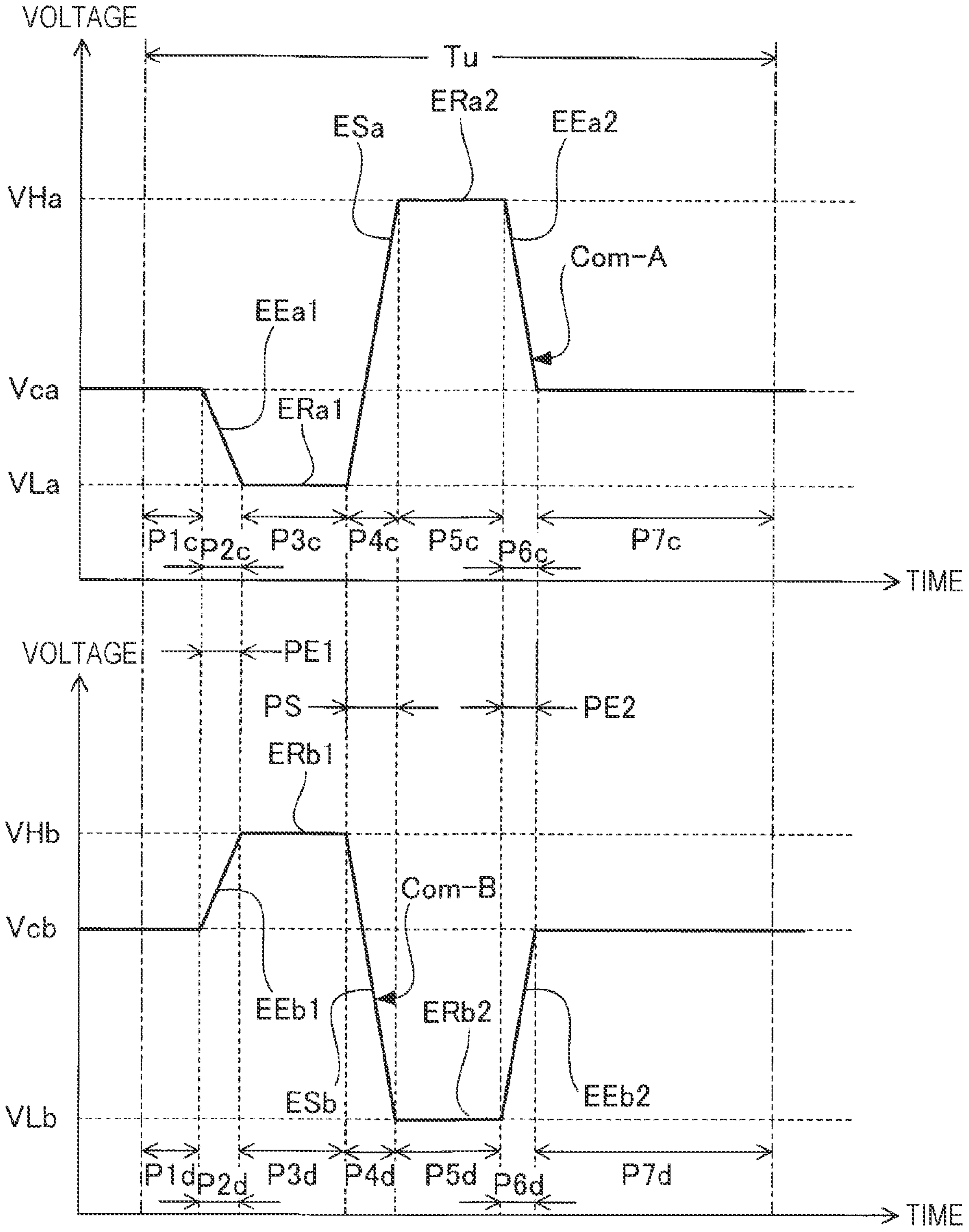
FIG. 20 is a graph for describing a first drive signal and a second drive signal in an eighth embodiment.

FIG. 20 is a diagram for describing the first drive signal and the second drive signal in the eighth embodiment. In the example illustrated in FIG. 20, the first drive signal Com-A is the same as the first drive signal COM-A of the sixth embodiment.

On the other hand, the second drive signal Com-B illustrated in FIG. 20 is a signal having a phase opposite to the first drive signal Com-A. That is, the second drive signal Com-B illustrated in FIG. 20 has a waveform that uses the intermediate potential Vcb as a reference potential and returns from the intermediate potential Vcb to the intermediate potential Vcb via the potential VHb and the potential VLb in this order within the unit period Tu.

Here, the potential of the second drive signal Com-B is maintained at the intermediate potential Vcb for the period P1*d*, rises from the intermediate potential Vcb to the potential VHb for the period P2*d*, is maintained at the potential VHb for the period P3*d*, drops from the potential VHb to potential VLb for the period P4*d*, is maintained at the potential VLb for the period P5*d*, rises from the potential VLb to the intermediate potential Vcb for the period P6*d*, and is maintained at the intermediate potential Vcb for the period P7*d*. The period P4*d* is an example of the "second period". The period P6*d* is an example of the "fourth period".

A waveform portion of the period P2*d* of the second drive signal Com-B described above is an example of the "second expansion element", and is the expansion element EEb1 that expands the volume of the pressure chamber C. A waveform portion of the period P3*d* of the second drive signal Com-B is a holding element ERb1, which is an example of the "second holding element". A waveform portion of the period P4*d* of the second drive signal Com-B is an example of the "second shrinkage element" and is the shrinkage element ESb that shrinks the volume of the pressure chamber C. A waveform portion of the period P5*d* of the second drive signal Com-B is a holding element ERb2, which is an example of the "second holding element". A waveform portion of the period P6*d* of the second drive signal Com-B is an example of the "second expansion element" and is the expansion element EEb2 that expands the volume of the pressure chamber C.

In the present embodiment, the waveform portion of the period P2*c* of the first drive signal Com-A is an example of the "first expansion element" and is the expansion element EEa1 that expands the volume of the pressure chamber C. A waveform portion of the period P3*c* of the first drive signal Com-A is a holding element ERa1, which is an example of the "first holding element". A waveform portion of the period P4*c* of the first drive signal Com-A is an example of the "first shrinkage element" and is the shrinkage element ESa that shrinks the volume of the pressure chamber C. A waveform portion of the period P5*c* of the first drive signal Com-A is a holding element ERa2, which is an example of the "first holding element". A waveform portion of the period P6*c* of the first drive signal Com-A is an example of the "first expansion element", and is an expansion element EEa2 that expands the volume of the pressure chamber C.

Here, at least a part of the period P2*c* of the first drive signal Com-A and at least a part of the period P2*d* of the second drive signal Com-B temporally overlap each other in the period PE1. In addition, at least a part of the period P4*c* of the first drive signal Com-A and at least a part of the period P4*d* of the second drive signal Com-B temporally overlap each other in the period PS. Furthermore, at least a part of the period P6*c* of the first drive signal Com-A and at least a part of the period P6*d* of the second drive signal Com-B temporally overlap each other in the period PE2.

Figure 21:
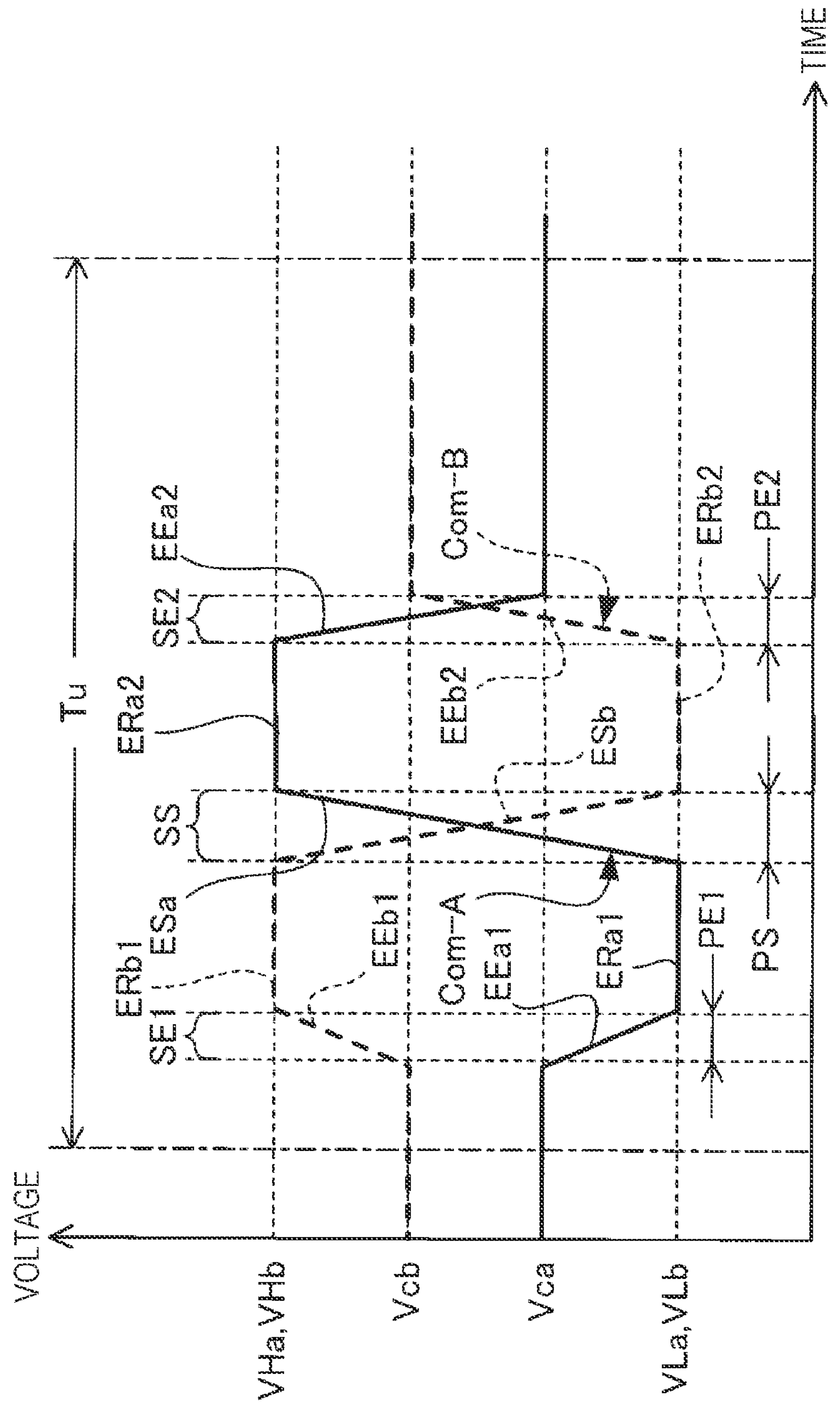
FIG. 21 is a graph for describing a shrinkage step, a first expansion step, and a second expansion step in the eighth embodiment.

FIG. 21 is a diagram for describing the shrinkage step SS, the first expansion step SE1, and the second expansion step SE2 in the eighth embodiment. In FIG. 21, the first drive signal Com-A is indicated by a solid line, and the second drive signal Com-B is indicated by a broken line. In the example illustrated in FIG. 21, the potential VHa and the potential VHb are equal to each other, and the potential VLa and the potential VLb are equal to each other. In addition, the intermediate potential Vcb is higher than the intermediate potential Vca.

The potential VHa and the potential VHb may be different from each other, and the potential VLa and the potential VLb may be different from each other.

In the period PE1, the first expansion step SE1 is executed. Thereafter, in the period PS, the shrinkage step SS is executed. Next, in the period PE2, the second expansion step SE2 is executed. Each of the first expansion step SE1 and the second expansion step SE2 has the same effects as that of the expansion step SE described above. That is, it can be said that the first expansion step SE1 and the second expansion step SE2 are included in the expansion step SE.

According to the eighth embodiment described above, the discharge characteristics of the liquid discharge apparatus 100 can also be improved. In the present embodiment, as described above, the expansion step SE includes the first expansion step SE1 and the second expansion step SE2. In the unit period Tu, the shrinkage step SS is executed between the first expansion step SE1 and the second expansion step SE2. Therefore, the amount of ink per discharge from the nozzle N can be increased similarly to the other embodiments. In addition, since each element included in the first drive signal Com-A and the second drive signal Com-B is executed at the same time, the time required for the unit period Tu can be shortened as a whole compared to the first to fifth embodiments. That is, it is possible to achieve both an increase in the discharge amount and a shortening of the discharge cycle of the liquid from the nozzles N.

9. Ninth Embodiment

Hereinafter, a ninth embodiment of the present disclosure will be described. Hereinafter, the description will focus on differences from the first embodiment.

Figure 22:
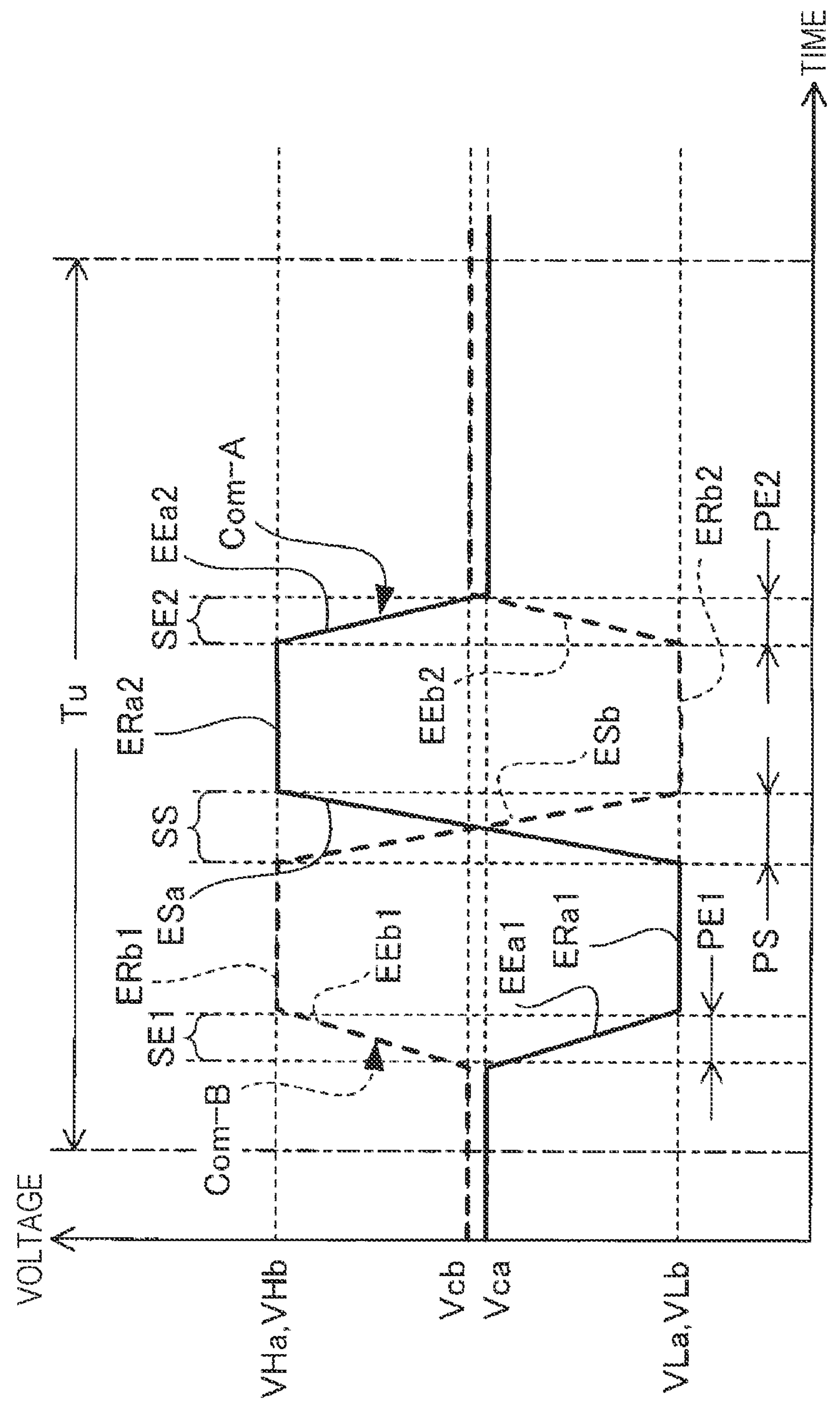
FIG. 22 is a graph for describing a shrinkage step, a first expansion step, and a second expansion step in a ninth embodiment.

FIG. 22 is a diagram for describing the shrinkage step SS, the first expansion step SE1, and the second expansion step SE2 in the ninth embodiment. The present embodiment is the same as the eighth embodiment described above, except that the potential difference between the intermediate potential Vca and the intermediate potential Vcb is different.

In the present embodiment, the potential difference between the intermediate potential Vca and the intermediate potential Vcb is smaller than that in the eighth embodiment. In the example illustrated in FIG. 22, although the intermediate potential Vcb is slightly higher than the intermediate potential Vca, the potential difference between the intermediate potential Vca and the intermediate potential Vcb is significantly small. The intermediate potential Vca and the intermediate potential Vcb may be equal to each other, or the intermediate potential Vcb may be lower than the intermediate potential Vca.

According to the ninth embodiment described above, the discharge characteristics of the liquid discharge apparatus 100 can also be improved, similarly to the eighth embodiment.

10. Tenth Embodiment

Hereinafter, a tenth embodiment of the present disclosure will be described. Hereinafter, the description will focus on differences from the first embodiment.

Figure 23:
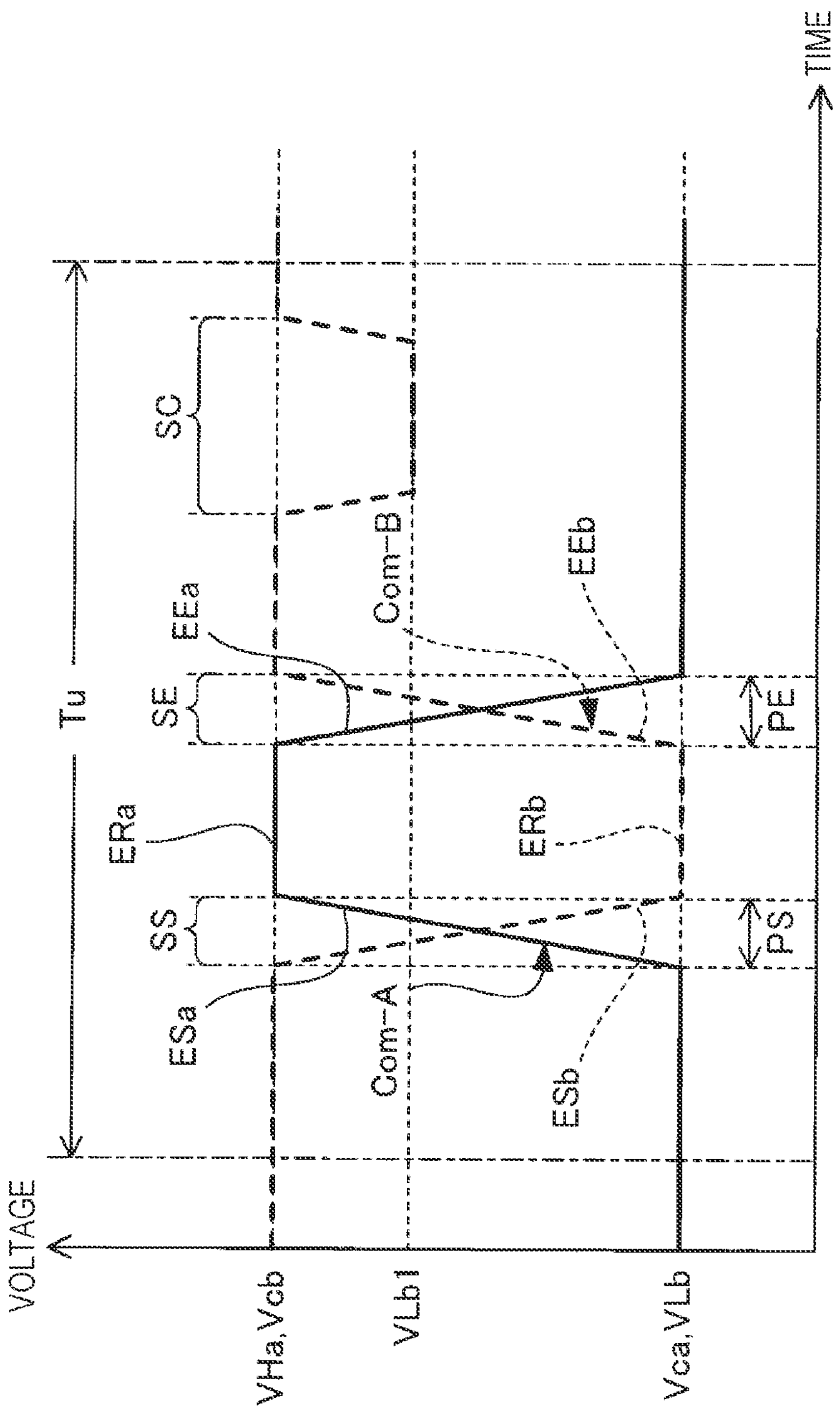
FIG. 23 is a graph for describing a shrinkage step and an expansion step in a tenth embodiment.

FIG. 23 is a diagram for describing the shrinkage step SS and the expansion step SE in the tenth embodiment. The present embodiment is the same as the sixth embodiment described above except that a waveform for the vibration damping step SC is added to the second drive signal Com-B.

In the present embodiment, the vibration damping step SC is executed by lowering the potential of the second drive signal Com-B from the intermediate potential Vcb to a potential VLb1 after the expansion step SE. The potential VLb1 is a potential between the intermediate potential Vcb and the potential VLb.

According to the tenth embodiment described above, the discharge characteristics of the liquid discharge apparatus 100 can also be improved. In the present embodiment, in addition to the same effects as those of the sixth embodiment, effects due to the vibration damping step SC can be obtained.

11. Modification Example

Each embodiment in the above illustration can be variously modified. Specific modification aspects that can be applied to each of the above-described embodiments are exemplified below. Two or more aspects randomly selected from the following examples can be appropriately merged to the extent that these aspects do not contradict each other.

11-1. Modification Example 1

Figure 24:
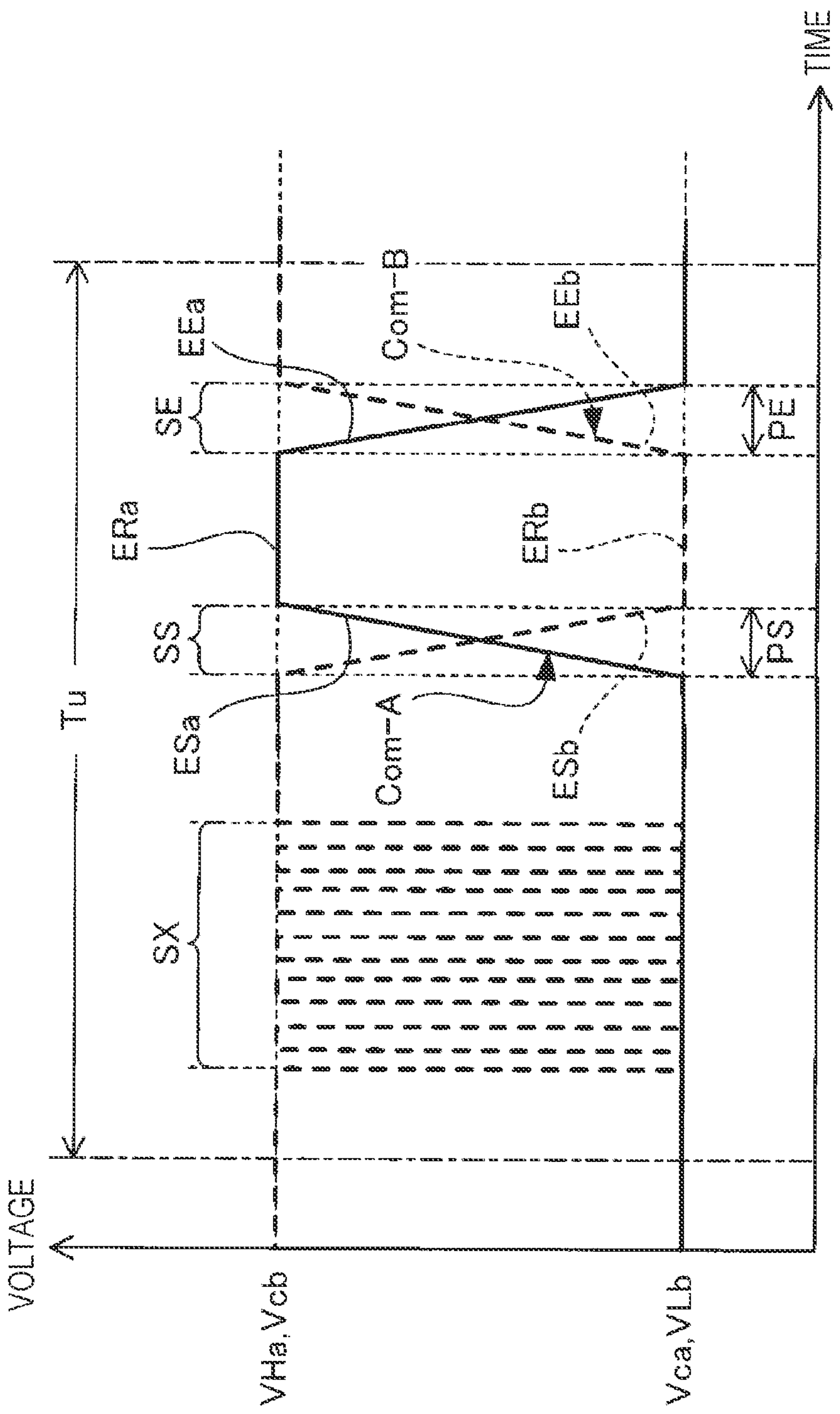
FIG. 24 is a graph for describing a shrinkage step and an expansion step in Modification Example 1.

FIG. 24 is a diagram for describing the shrinkage step SS and the expansion step SE in Modification Example 1. Modification Example 1 is the same as the above-described sixth embodiment except that a step SX is added before the shrinkage step SS.

In the example illustrated in FIG. 24, the step SX is executed by repeatedly lowering the potential of the second drive signal Com-B from the intermediate potential Vcb to the potential VLb a plurality of times before the shrinkage step SS. According to Modification Example 1 described above, the discharge characteristics of the liquid discharge apparatus 100 can also be improved. A waveform used in step SX is not limited to the example illustrated in FIG. 24, and is random. According to the step SX, for example, it is possible to generate vibration to such an extent that ink is not discharged, put the pressure chamber C in an expanded state immediately before the period PS, and adjust so as to excite the vibration during discharge. In addition, according to the step SX, the intermediate potential Vcb, which is a high potential, is not normally maintained in the standby state where liquid is not discharged, so that power consumption of the drive signal generation circuit 24 can be suppressed.

11-2. Modification Example 2

Although the configuration in which the piezoelectric layer is interposed between the individual electrodes and the common electrode is exemplified in the above embodiment, the present disclosure is not limited thereto, and a configuration in which a piezoelectric layer is interposed between the individual electrodes may be used.

11-3. Modification Example 3

Although the serial-type liquid discharge apparatus 100 in which the carriage 41 on which the liquid discharge head 50 is mounted is reciprocated is exemplified in each of the above-described embodiments, the present disclosure can also be applied to a line-type liquid discharge apparatus in which a plurality of nozzles N are distributed over the entire width of the medium M.

11-4. Modification Example 4

The liquid discharge apparatus 100 exemplified in each of the above-described embodiments can be employed in various types of equipment such as facsimile machines and copiers, in addition to equipment dedicated to printing. However, the application of the liquid discharge apparatus of the present disclosure is not limited to printing. For example, a liquid discharge apparatus that discharges a solution of a coloring material is used as a manufacturing apparatus for forming a color filter of a liquid crystal display device. In addition, a liquid discharge apparatus for discharging a solution of a conductive material is used as a manufacturing apparatus for forming wiring and electrodes on a wiring substrate.

What is claimed is:

1. A liquid discharge apparatus comprising:

a diaphragm that has a first surface and a second surface facing in a direction opposite to the first surface;

a pressure chamber substrate laminated on the first surface and including a partition wall partitioning a pressure chamber communicating with a nozzle for discharging liquid;

a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion; and a drive signal generation portion that generates a first drive signal that drives the first active portion and a second drive signal that drives the second active portion, wherein the first drive signal includes a first shrinkage element that shrinks a volume of the pressure chamber per periodic unit period, the second drive signal includes a second shrinkage element that shrinks the volume of the pressure chamber per unit period, and a shrinkage step is executed in which a first period and a second period overlap, and the first shrinkage element is supplied to the first active portion in the first period, and the second shrinkage element is supplied to the second active portion in the second period.

2. The liquid discharge apparatus according to claim 1, wherein during executing the shrinkage step, a magnitude relationship between potentials of the first drive signal and the second drive signal is reversed.

3. The liquid discharge apparatus according to claim 1, wherein in the unit period, a start timing of the first shrinkage element is later than a start timing of the second shrinkage element.

4. The liquid discharge apparatus according to claim 3, wherein in the unit period, an end timing of the first shrinkage element is later than an end timing of the second shrinkage element.

5. The liquid discharge apparatus according to claim 1, wherein the first drive signal includes a first expansion element that expands the volume of the pressure chamber per unit period, the second drive signal includes a second expansion element that expands the volume of the pressure chamber per unit period, and an expansion step is executed in which a third period during which the first expansion element is supplied to the first active portion and a fourth period during which the second expansion element is supplied to the second active portion overlap.

6. The liquid discharge apparatus according to claim 5, wherein in the unit period, the expansion step is executed before the shrinkage step.

7. The liquid discharge apparatus according to claim 5, wherein in the unit period, the expansion step is executed after the shrinkage step.

8. The liquid discharge apparatus according to claim 7, wherein the first drive signal includes a first holding period that holds a voltage after the first shrinkage element, the second drive signal includes a second holding period that holds a voltage after the second shrinkage element, and lengths of the first holding period and the second holding period are different.

9. The liquid discharge apparatus according to claim 7, wherein the first drive signal and the second drive signal are signals having mutually opposite phases.

10. The liquid discharge apparatus according to claim 7, wherein in a standby state where liquid is not discharged from the nozzle, the second drive signal maintains a state where the volume of the pressure chamber is expanded.

11. The liquid discharge apparatus according to claim 5, wherein the first period and the fourth period do not overlap, and the second period and the third period do not overlap.

12. The liquid discharge apparatus according to claim 5, wherein the expansion step includes a first expansion step and a second expansion step, and in the unit period, the shrinkage step is executed between the first expansion step and the second expansion step.

13. The liquid discharge apparatus according to claim 1, wherein the piezoelectric element includes a third active portion that overlaps the pressure chamber at a position closer to the outer edge of the pressure chamber than the first active portion when viewed in the thickness direction of the diaphragm, and the first active portion is located between the second active portion and the third active portion when viewed in the thickness direction of the diaphragm.

14. The liquid discharge apparatus according to claim 13, wherein the piezoelectric element includes a first electrode layer, a piezoelectric layer, and a second electrode layer in this order in a direction away from the diaphragm, the piezoelectric layer and the second electrode layer are provided in common over the first active portion, the second active portion, and the third active portion, and the first electrode layer includes a plurality of individual electrodes individually provided in the first active portion, the second active portion, and the third active portion.

15. A liquid discharge apparatus comprising:

a diaphragm that has a first surface and a second surface facing in a direction opposite to the first surface;

a pressure chamber substrate laminated on the first surface and including a partition wall partitioning a pressure chamber communicating with a nozzle for discharging liquid;

a piezoelectric element laminated on the second surface and including a first active portion that overlaps a center of the pressure chamber when viewed in a thickness direction of the diaphragm and a second active portion that overlaps the pressure chamber at a position closer to an outer edge of the pressure chamber than the first active portion; and a drive signal generation portion that generates a first drive signal that drives the first active portion and a second drive signal that drives the second active portion, wherein the first drive signal includes a first period during which a first potential changes to a second potential per periodic unit period, the second drive signal includes a second period during which a third potential changes to a fourth potential per unit period, and the first period and the second period overlap.

16. The liquid discharge apparatus according to claim 15, wherein in a period during which the first period and the second period overlap, a magnitude relationship between voltages of the first drive signal and the second drive signal is reversed.

17. The liquid discharge apparatus according to claim 15, wherein in the unit period, a start timing of the first period is later than a start timing of the second period.

18. The liquid discharge apparatus according to claim 15, wherein the first drive signal, per unit period, includes a first holding period that follows the first period and holds the second potential, and a third period that follows the first holding period and during which the second potential changes to a fifth potential, the second drive signal, per unit period, includes a second holding period that follows the second period and holds the fourth potential, and a fourth period that follows the second holding period and during which the fourth potential changes to a sixth potential, and the third period and the fourth period overlap.

19. The liquid discharge apparatus according to claim 18, wherein in a period during which the third period and the fourth period overlap, a magnitude relationship between potentials of the first drive signal and the second drive signal is reversed.

20. The liquid discharge apparatus according to claim 18, wherein lengths of the first holding period and the second holding period are different.

* * * * *